(12) United States Patent
Yamaguchi et al.

(10) Patent No.: US 7,595,902 B2
(45) Date of Patent: Sep. 29, 2009

(54) RECEIVING DEVICE, PRINTER, AND FIRMWARE UPDATE SYSTEM

(75) Inventors: Takehito Yamaguchi, Hirakata (JP); Shigeki Matsunaga, Kadoma (JP)

(73) Assignee: Panasonic Corporation, Osaka (JP)

( * ) Notice: Subject to any disclaimer, the term of this patent is extended or adjusted under 35 U.S.C. 154(b) by 615 days.

(21) Appl. No.: 10/508,813

(22) PCT Filed: Mar. 31, 2003

(86) PCT No.: PCT/JP03/04062

§ 371 (c)(1), (2), (4) Date: Sep. 23, 2004

(87) PCT Pub. No.: WO03/083639

PCT Pub. Date: Oct. 9, 2003

(65) Prior Publication Data

US 2005/0158100 A1    Jul. 21, 2005

(30) Foreign Application Priority Data

Apr. 1, 2002    (JP) .............................. 2002-099420
Feb. 28, 2003    (JP) .............................. 2003-053507

(51) Int. Cl.
G06F 15/00    (2006.01)
G06F 3/12    (2006.01)
G06K 1/00    (2006.01)
(52) U.S. Cl. .................................... 358/1.15; 358/1.13
(58) Field of Classification Search ................ 358/1.15, 358/1.1, 1.13, 1.14, 1.9
See application file for complete search history.

(56) References Cited

U.S. PATENT DOCUMENTS

| 6,930,785 | B1 * | 8/2005 | Weyand et al. ............... 358/1.1 |
| 7,246,348 | B1 * | 7/2007 | Mixer, Jr. ..................... 717/168 |
| 2001/0003827 | A1 * | 6/2001 | Shimamura ................. 709/206 |
| 2001/0027469 | A1 | 10/2001 | Torikai |
| 2002/0022990 | A1 | 2/2002 | Kurata et al. |

FOREIGN PATENT DOCUMENTS

| EP | 1 071 007 | 1/2001 |
| EP | 1091531 | 4/2001 |

(Continued)

OTHER PUBLICATIONS

European Search Report issued May 26, 2008 issued for the European patent application No. 03715640.3 which is a foreign counter part of the present application.

Primary Examiner—Douglas Q Tran
(74) Attorney, Agent, or Firm—Wenderoth, Lind & Ponack, L.L.P.

(57) ABSTRACT

A set top box (120), to which a printer (130) is connected, includes: a reception unit (121) to receive update data for updating a firmware of the printer and a display content which includes a description indicating that the update data is to be printed; a display data generation unit (122) to generate display data for displaying the display content on the TV (123); a remote control reception unit (125) to receive a print command for the display content; and a print output unit (127) to output, to the printer (130), the update data, as data to be printed, when the remote control reception unit (125) receives the print command.

12 Claims, 26 Drawing Sheets

FOREIGN PATENT DOCUMENTS

| | | |
|---|---|---|
| JP | 8-101605 | 4/1996 |
| JP | 8-194510 | 7/1996 |
| JP | 10-269107 | 10/1998 |
| JP | 11-212891 | 8/1999 |
| JP | 2000-6497 | 1/2000 |
| JP | 2000-312349 | 11/2000 |
| JP | 2001-118096 | 4/2001 |
| JP | 2001-216115 | 8/2001 |
| JP | 2001-275069 | 10/2001 |
| JP | 2001-290611 | 10/2001 |
| JP | 2002-62998 | 2/2002 |
| JP | 2002-83097 | 2/2002 |
| WO | 00/75757 | 12/2000 |

\* cited by examiner

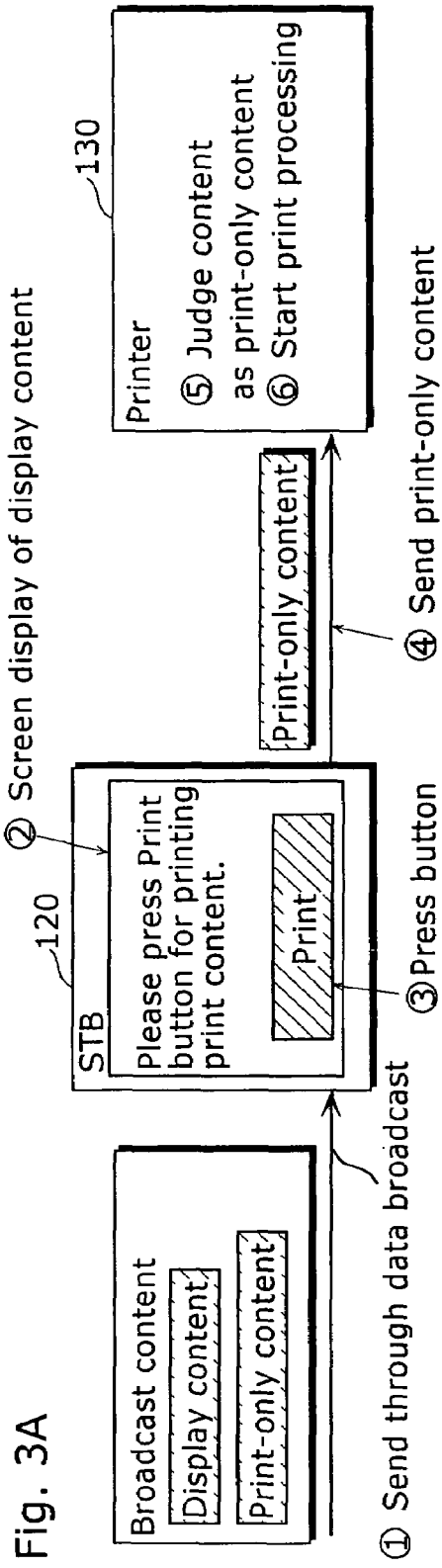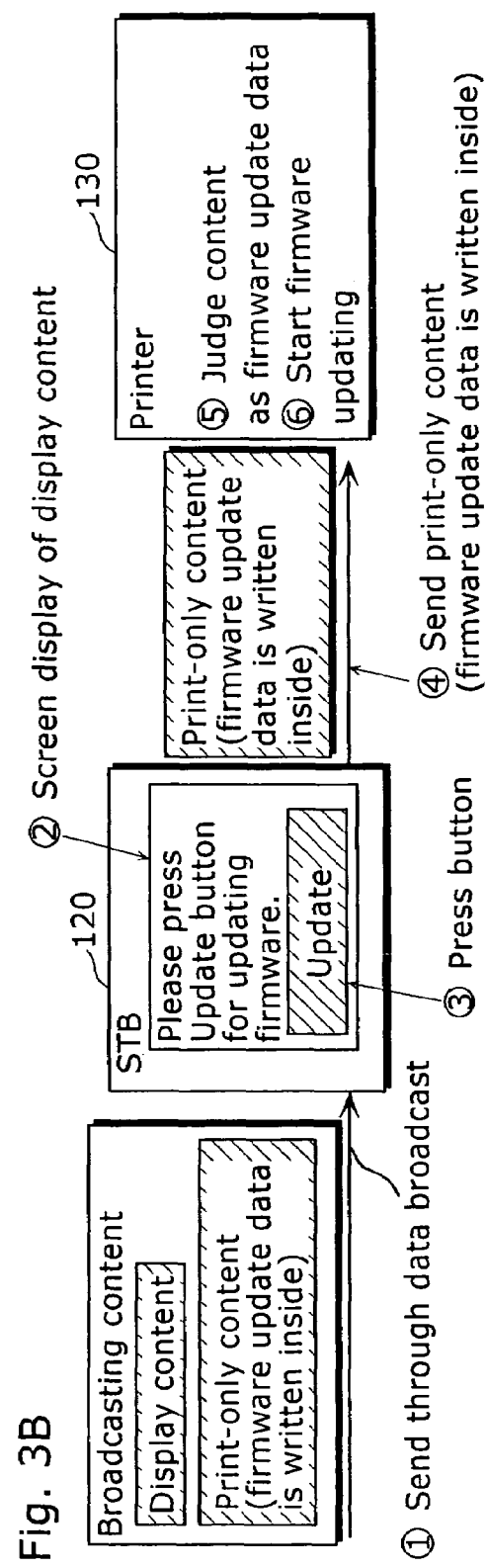
Fig. 3A
Fig. 3B

Fig. 5A

Display "Shopping.bml"

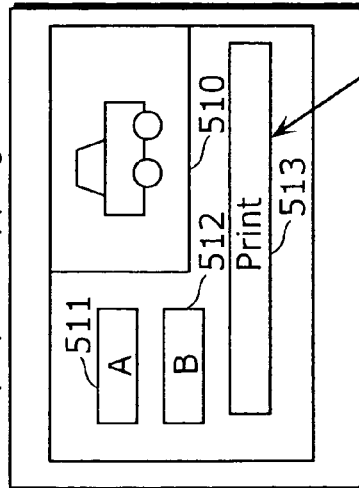

Fig. 5B

```
<?xml version="1.0" encoding="Shift_JIS" ?>                                    } L501
<!DOCTYPE bml PUBLIC "+//ARIB STD-B24:1999//DTD BML
 Document//JA" "bml_1_0.dtd">
<?bml bml-version="1.0" ?>                                                     } L502
<bml>
 <head>
  <title>shopping</title>
  <script>
  <![CDATA[
   function keydown() {                                                        } L503
    browser.print("./top_print.xhtmlp");
   }
  ]]>
  </script>
 </head>
 <body>
  <object id="video" type="video/X-arib-mpeg2" data="/50"                      } L504
   style="left:528px; top:40px; width:360px; height:202px" />
  <object type="image/X-arib-png" id="A" data="a_btn.png"                      } L505
   style="left:68px; top:150px; width:176px; height:48px;"/>
  <object type="image/X-arib-png" id="B" data="b_btn.png"                      } L506
   style="left:68px; top:300px; width:176px; height:48px;"/>
  <object type="image/X-arib-png" id="print" data="print_btn.png"              } L507
   style="left:80px; top:456px; width:720px; height:48px;"
   onkeydown="keydown();"/>
 </body>
</bml>
```

Fig. 6

```
<?xml version="1.0"?>
<!DOCTYPE html PUBLIC "-//PWG//DTD XHTML-Print 1.0//EN"
"http://www.pwg.org/xhtml-print/xhtml-print10.dtd">
<html xmlns="http://www.w3.org/1999/xhtml">
  <head>
    <title> TV Shopping </title>
  </head>
  <body>
    <p>
    TV shopping through data broadcast
       ..
       (Omission)
       ..
    End of printing
    </p>
    <!? image__ >                                                      ⎫ L601
    <object type="image/jpeg" data="image.jpeg"                        ⎫
     style="left:528px; top:40px; width:360px; height:202px"/>         ⎭ L602
  </body>
</html>
```

Fig. 7A

"update.bml" display 710

For updating on-line firmware of printer, please press "Firmware update" button. 711

Firmware update

Fig. 7B

```
<?xml version="1.0" encoding="Shift_JIS" ?>
<!DOCTYPE bml PUBLIC "+//ARIB STD-B24:1999//DTD BML
Document//JA" "bml_1_0.dtd">
<?bml bml-version="1.0" ?>
<bml>
  <head>
    <title>update</title>
    <script>
    <![CDATA[
      function keydown() {
        browser.print("./top_update.xhtmlp");
      }
    ]]>
    </script>
  </head>
  <body>
    <p>
      For updating on-line firmware of printer,
      please press "Firmware update" button.
    </p>
    <object type="image/X-arib-png" id="print" data="update_btn.png"
    style="left:68px; top:456px; width:176px; height:48px;"
    onkeydown="keydown();"/>
  </body>
</bml>
```

L701 (function keydown block)
L702 (paragraph block)
L703 (object tag)

Fig. 8

```
<?xml version="1.0"?>
<!DOCTYPE html PUBLIC "-//PWG//DTD XHTML-Print 1.0//EN"
"http://www.pwg.org/xhtml-print/xhtml-print10.dtd">
<html xmlns="http://www.w3.org/1999/xhtml">
<head>
  <title> Update </title>
</style>
</head>
<body>
  <update printer_vendor="MEI" soft_version="5.0.1"    ⎤ L801
    machine_type="cefiro2002" option_unit=""          ⎦
    src="update.data"/>   L802
  <p>version of firmware is updated.      ⎤
  present version is "5.0.1"</p>           ⎦ L803
  </update>
</body>
</html>
```

Fig. 12A

Display "Shopping.bml"

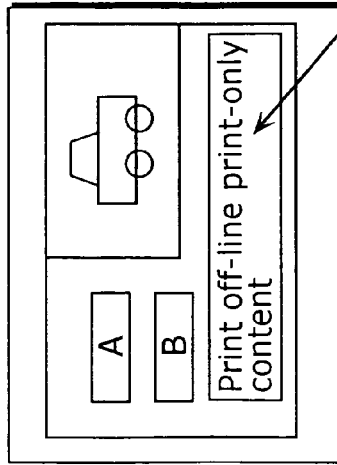

Fig. 12B

```
<?xml version="1.0" encoding="Shift_JIS" ?>
<!DOCTYPE bml PUBLIC "+//ARIB STD-B24:1999//DTD BML Document//JA" "bml_1_0.dtd">
<?bml bml-version="1.0" ?>
<bml>
  <head>
    <title>shopping</title>
    <script>
    <![CDATA[
      function keydown() {
        browser.save("./top_print.xhtmlp", "SD");   } L1201
        browser.save("./image.jpg", "SD");
      }
    ]]>
    </script>
  </head>
  <body>
    <object id="video" type="video/X-arib-mpeg2" data="/50"
      style="left:528px; top:40px; width:360px; height:202px" />
    <object type="image/X-arib-png" id="A" data="a_btn.png"
      style="left:68px; top:456px; width:176px; height:48px;" />
    <object type="image/X-arib-png" id="B" data="b_btn.png"
      style="left:68px; top:456px; width:176px; height:48px;" />
    <object type="image/X-arib-png" id="print" data="print_btn.png"
      style="left:68px; top:456px; width:176px; height:48px;"
      onkeydown="keydown();" />           L1202
  </body>
</bml>
```

Fig. 13A

Display "update.bml"

```
Firmware of printer needs to
be updated. Please press
Firmware update button and
update firmware.

[ Firmware update ]
```

Fig. 13B

```
<?xml version="1.0" encoding="Shift_JIS" ?>
<!DOCTYPE bml PUBLIC "+//ARIB STD-B24:1999//DTD BML
Document//JA" "bml_1_0.dtd">
<?bml bml-version="1.0" ?>
<bml>
  <head>
    <title>update</title>
    <script>
    <![CDATA[
      function keydown() {
        browser.save("./top_update.xhtmlp",  "SD");   ┐ L1301
        browser.save("./update.data",  "SD");          ┘
      }
    ]]>
    </script>
  </head>
  <body>
    <p>
      Firmware of printer needs to be updated.
      Please press Firmware update button and update firmware.    } L1302
    </p>
    <object type="image/X-arib-png" id="print" data="update_btn.png"
      style="left:68px; top:456px; width:176px; height:48px;"
      onkeydown="keydown();"/>    ⎱ L1303
  </body>
</bml>
```

Fig. 14

```
<?xml version="1.0"?>
  <!DOCTYPE html PUBLIC "-//PWG//DTD XHTML-Print 1.0//EN"
  "http://www.pwg.org/xhtml-print/xhtml-print10.dtd">
  <html xmlns="http://www.w3.org/1999/xhtml">
  <head>
     <title> Test Pages </title>
</style>
  </head>
  <body>
     <update   printer_vendor="MEI" version="5.0.1">
         src="http://www.virtual.co.jp /firm.data"/>
  </update>
   </body>
</html>
```

```
<?xml version="1.0" encoding="Shift_JIS" ?>
<!DOCTYPE bml PUBLIC "+//ARIB STD-B24:1999//DTD BML
  Document//JA" "bml_1_0.dtd">
<?bml bml-version="1.0" ?>
<bml>
  <head>
    <title>update</title>
    <script>
<![CDATA[
    function keydown() {
      //in the case of only two makers
      if{browser.getPrinterMaker ID()==10} //in the case where maker ID is 10
      {
        if{browser.getPrinterTypeID()==1) //in the case where model ID is 1
        {
          if{browser.getPrinterSoftwareVersion()<2) //in the case where version ID is no more than 2
          {
            browser. print "./top_update_maker10_type1_v2.xhtmlp "}://print (actually update version)
          }
          else//in the case where model ID is 2
          {
            //make visible button "This is latest version.  No need to update firmware".
            //processing details omitted
          }
        }
        else 1*(browser. getPrinterTypeID()==2) //in the case where model ID is 2
        {
          //only ".top_update_maker10_type1_v2.xhtmlp" changes as
in the case where model ID is 1
        }
        else //in the case where model ID is neither 1 nor 2
        {
          // make visible button "No version-upgrade data corresponding to
model is found".
          //processing details omitted
        }
      }
      else if (browser getPrinterMakerID()==20) //in the case where maker ID is 20
      {
        //omitted as in the case where maker ID is 10
      }
      else//in the case where maker ID is neither 10 nor 20
      {
        // make visible button "No version-upgrade data corresponding to
maker is found".
      }
    }
]]>
    </script>
  </head>
  <body>
    <p>
        For updating on-line firmware of printer, please press
        "Firmware update" button.
    </p>
    <object type="image/X-arib-png" id="print" data="print_btn.png"
    style="left:68px; top:456px; width:176px; height:48px;"
    onkeydown="keydown();"/>
  </body>
</bml>
```

Fig. 17

Examples of API:

```
int browser. getPrinterMakerID():
    Return value: -1 (error)
        No fewer than 0 is maker ID
----------------------------------------
int browser. getPrinterTypeID():
    Return value: -1 (error)
        No fewer than 0 is model ID (maker uniquely assigns)
----------------------------------------
int browser. getPrinterSoftwareVersion():
    Return value: -1 (error)
        No fewer than 0 is version ID (maker uniquely assigns)
```

Fig. 18

Examples of API:

```
int browser. getCapablePrinterNumber():
    Return value: -1: error
              0: success
              N: number of printers connected
```
---
```
int browser. getCapablePrinterList(int List[]):
    Argument: printer list: (variable length sequence:
              update value)
    Return value: -1: error
              0: success
```
---
```
int browser. getPrinterMakerID(int printerID):
    Argument: printer ID (printer ID obtained from "browser.
              getCapablePrinterList")
    Return value: -1: (error)
              No fewer than 0 is maker ID
```
---
```
int browser. getPrinterTypeID():
    Argument: printer ID (printer ID obtained from "browser.
              getCapablePrinterList")
    Return value: -1: (error)
              No fewer than 0 is model ID
              (maker uniquely assigns)
```
---
```
int browser. getPrinterSoftwareVersion():
    Argument: printer ID (printer ID obtained from "browser.
              getCapablePrinterList")
    Return value: -1: (error)
              No fewer than 0 is version ID
              (maker uniquely assigns)
```

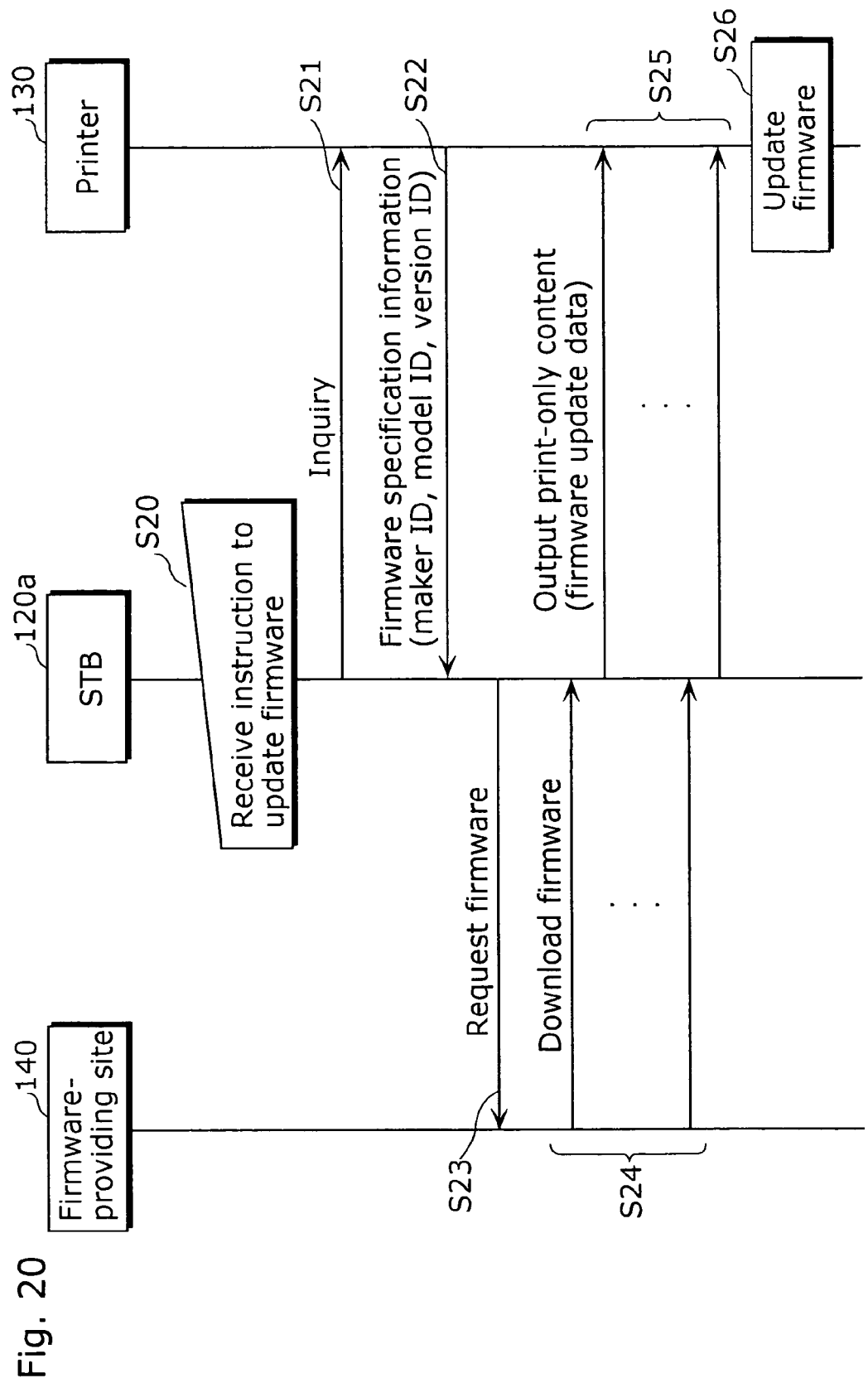

Fig. 21

```xml
<?xml version="1.0" encoding="Shift_JIS" ?>
<!DOCTYPE bml PUBLIC "+//ARIB STD-B24:1999//DTD BML
  Document//JA" "bml_1_0.dtd">
<?bml bml-version="1.0" ?>
<bml>
  <head>
    <title>update</title>
  <script>
<![CDATA[
    function keydown() {
      //in the case of only two makers
      if{browser.getPrinterMaker ID()==10} //in the case where maker ID is 10
      {
        if{browser.getPrinterTypeID()==1) //in the case where model ID is 1
        {
          if{browser.getPrinterSoftwareVersion()<2) //in the case where version ID is
no more than 2
          {
browser. print ("http://makerID/type1/v2/top_update_maker10_type1_v2.
xhtmlp "):
                //download from Internet and print (actually
update version) }
              }
              //omission
          }
          //omission
      }
      //omission
    }
]]>
  </script>
  </head>
  <body>
        //omission
  </body>
</bml>
```

Fig. 23

```
<?xml version="1.0" encoding="Shift_JIS" ?>
<!DOCTYPE bml PUBLIC "+//ARIB STD-B24:1999//DTD BML
 Document//JA" "bml_1_0.dtd">
<?bml bml-version="1.0" ?>
<bml>
  <head>
    <title>update</title>
    <script>
<![CDATA[
    function keydown() {
        //in the case of only two makers
        if{browser.getPrinterMaker ID()==10} //in the case where maker ID is 10
        {
            if{browser.getPrinterTypeID()==1) //in the case where model ID is 1
            {
                if{browser.getPrinterSoftwareVersion()<2) //in the case where version ID is
no more than 2
                {
browser. print ("http://maker10/type1/v2/top_update_maker10_type1_v2.
xhtmlp "):
    /top_update_maker10_type1_v2. xhtmlp ")
                browser_print("top_update_maker10_type1_v2. xhtmlp "):
                //download from Internet and print (actually update
version) }
                }
                //omission
            }
            //omission
        }
        //omission
    }
]]>
    </script>
  </head>
  <body>
            //omission
  </body>
</bml>
```

Fig. 25

```
<?xml version="1.0"?>
  <!DOCTYPE html PUBLIC "-//PWG//DTD XHTML-Print 1.0//EN"
  "http://www.pwg.org/xhtml-print/xhtml-print10.dtd">
  <html xmlns="http://www.w3.org/1999/xhtml">
  <head>
    <title> Update </title>
</style>
  </head>
  <body>
    <update  printer_vendor="MEI" soft_version="5.0.1"
      machine_type="cefiro2002" option_unit="" >         ⎯L801
src="update.dll"/>    L802
    <p>version of firmware is updated.
    present version is 5.0.1.</p>                } L803
    </update>
  </body>
</html>
```

RECEIVING DEVICE, PRINTER, AND FIRMWARE UPDATE SYSTEM

BACKGROUND OF THE INVENTION

1. Field of the Invention

The present invention relates to a firmware updating system for updating a firmware of a printer.

2. Description of the Related Art

Recently, along with digitization of TV broadcasts, various services became available to the users who watch TV. Among these services, for example, in case of home shopping, e-mail delivery or timetable guide where there is a necessity to reconfirm the services and the information they received, there are many cases where it is convenient for the users to keep at hand a list of names of the products or the e-mails they received, after checking beforehand the details of desired information on the TV screen. Therefore, a system to receive information from a receiving apparatus such as a Set Top Box (STB) and a Digital TV (DTV) so as to print the received information with the printer which is directly connected to the receiving apparatus is useful. Under this system, the STB or the DTV is connected to the printer via an I/F such as an IEEE1394 bus or the like. The following is an explanation of a case where a receiving apparatus is an STB, but the same applies to the case of using a DTV.

The broadcast content delivered through the TV broadcast as mentioned above is described with Broadcast Markup Language (BML) so as to start the broadcasting. It is, however, possible to use other markup language, for instance, Hyper Text Markup Language (HTML). Each file in the broadcast content described with these languages is objectified by a Document Object Model (DOM), a general-purpose Application Programming Interface (API), in the STB, and is transferred to an application. Consequently, the content on the website can be distributed through the TV broadcast without needing any special processing. It is therefore natural to use the markup language, as in these cases, in order to have the printer print when content for printing which is necessary for the printer to print is described in such broadcast content.

In the aforementioned system, it is necessary for a receiving apparatus or a printing apparatus to analyze the print content described in the markup languages and perform rasterizing to it so as to create picture data. There exists a system consisting of a personal computer and an ink jet printer connected to it as an example of such a system in which a host apparatus creates picture data.

Here, it is undesirable to have the receiving apparatus perform the aforementioned picture data generating processing as it causes a decline in performance of original functions of the receiving apparatus such as a display of broadcast data while printing processing is under way. Also, not all the receiving apparatuses are connected to the printing apparatus, which necessitates installing of a picture data generating processing module to the receiving apparatus that is not connected to the printing apparatus, which is a disadvantage in terms of cost.

Provided that a system in which a printing apparatus performs the picture data generating processing is introduced, the above problem can be solved.

Meanwhile, these markup languages, however, have been developed rapidly and there is a high possibility that the version-upgrades take place in the future. In this case, there comes in a necessity to update functions and processing procedures of a printing apparatus according to the extended functions of the markup languages. Also, it will be necessary to update a firmware of a printer along with the extended functions of printers.

However, an STB is by nature an apparatus to display the received broadcasting content on a TV monitor, therefore, it does not include a mechanism to update firmware of various peripheral apparatuses such as a printer. There arises a problem of needing a significant system change in the STB in order to implement the system to update firmware of various peripheral apparatuses.

The present invention has been devised in view of these circumstances and it is an object of the present invention to provide a firmware updating system, which realizes an updating of a firmware of a printer without adding any special components in the STB, together with a receiving apparatus and a printing apparatus.

SUMMARY OF THE INVENTION

In order to achieve the above object, the receiving apparatus according to the present invention is a receiving apparatus to be used in a printing system including a printing apparatus and a receiving apparatus. The receiving apparatus comprises a reception unit operable to receive externally: (i) update data for updating a firmware of the printing apparatus; and (ii) a display content which includes a description indicating that the update data is to be printed; a display unit operable to display the display content; a command obtainment unit operable to obtain a print command for the display content; and an output unit operable to output the update data as data to be printed, according to the description, when the command obtainment unit obtains the print command.

Thus, according to the receiving apparatus of the present invention, it is possible to display for guiding the user to update a firmware based on the display content, and also, the update data can be outputted to a printing apparatus in the same manner as in the case of normal print processing in accordance with the print command for the display content.

As a result, a firmware of the printer can be updated without adding, to the receiving apparatus, a new component for updating the firmware of the printing apparatus. Furthermore, the display errors occurred in the receiving apparatus can be prevented by allowing the receiving apparatus to print, but not to display, the firmware update data. The present invention is therefore of great significance.

Also, a printing apparatus according to the present invention is a printing apparatus used in a system including a receiving apparatus which receives from a server update data to update a firmware of the printing apparatus and outputs the received update data to the printing apparatus and the printing apparatus, said printing apparatus comprising: an obtainment unit operable to obtain the update data from the receiving apparatus in the case where the receiving apparatus receives a display content containing a description indicating that the update data is to be printed, and outputs to the printing apparatus the update data as data to be printed according to the print command for the display content; and an updating unit operable to update the firmware using the obtained update data.

Moreover, the server according to the present invention is a server to be used under a firmware updating system including a server that distributes a content, a receiving apparatus that receives the content from the server, and a printing apparatus that operates according to a firmware stored in a ROM, and prints a print content inputted from the receiving apparatus, the server comprising: a content generation unit operable to generate a content that includes a firmware update file, as a print content which is not to be displayed, said file being a file in which data for updating a firmware of the printing apparatus is described; and a content sending unit operable to send the generated content to the receiving apparatus.

It should be noted that the present invention can be realized not only as the server, the receiving apparatus and the printing apparatus as described above, but also as a system configured by these apparatuses or as a method which includes the above-mentioned characteristic units included in each of the apparatuses as steps, and even as a program which causes a computer to execute these steps. The characteristic broadcast content composed of the update data and the display content can surely be distributed by delivering it not only through a broadcasting network but also through a communication network like the Internet, or by storing it in a storage medium like a CD-ROM.

BRIEF DESCRIPTION OF THE DRAWINGS

FIGS. 3A and 3B show respectively the contents used in the firmware updating system presented in FIG. 1 and a sequence of processing at each unit;

FIG. 5A shows an example of the file of the display content "shopping.bml" shown in FIG. 4A while FIG. 5B shows an example of its display;

FIG. 6 is a diagram showing an example of the file "top_print.xhtmlp" outputted to the printer when a print button is pressed on a displayed screen shown in FIG. 5A;

FIG. 7A shows an example of the file of the display content "update.bml" while FIG. 7B shows an example of its display;

FIG. 8 shows an example of the file "top_update.xhtmip" outputted to the printer when an updating button is pressed on a displayed screen shown in FIG. 7A;

FIGS. 12A and 12B show an example of the file of the broadcast e-mail "shopping.bml" and an example of its display for printing off-line a normal print-only content;

FIGS. 13A and 13B are diagrams showing an example of the file of the broadcast e-mail "update.bml" and an example of its display for updating off-line a firmware;

FIG. 14 shows an example of the file of the print-only content to be used for firmware updating "top_update.xhtmlp" in the case where the data file to be used for firmware updating "firm.data" is specified at a URL;

FIG. 16 shows an example of the display content that allows a brunch processing in FIG. 15;

FIG. 17 shows meanings of various types of functions (API) used in the display content shown in FIG. 16;

FIG. 18 shows meanings of other types of functions (API);

FIG. 20 is a diagram showing a sequence of updating the firmware of the printer under the same system;

FIG. 21 shows an example of the display content which allows the STB to acquire on-demand firmware update data;

FIG. 23 shows an example of the display content delivered to the STB under the same system;

FIG. 25 shows an example of the firmware update data "top_update.xhtmlp" that is realized as a difference DLL file.

DETAILED DESCRIPTION OF THE INVENTION

The following describes in detail the embodiments of the present invention with reference to the drawings.

First Embodiment

Figure 1:
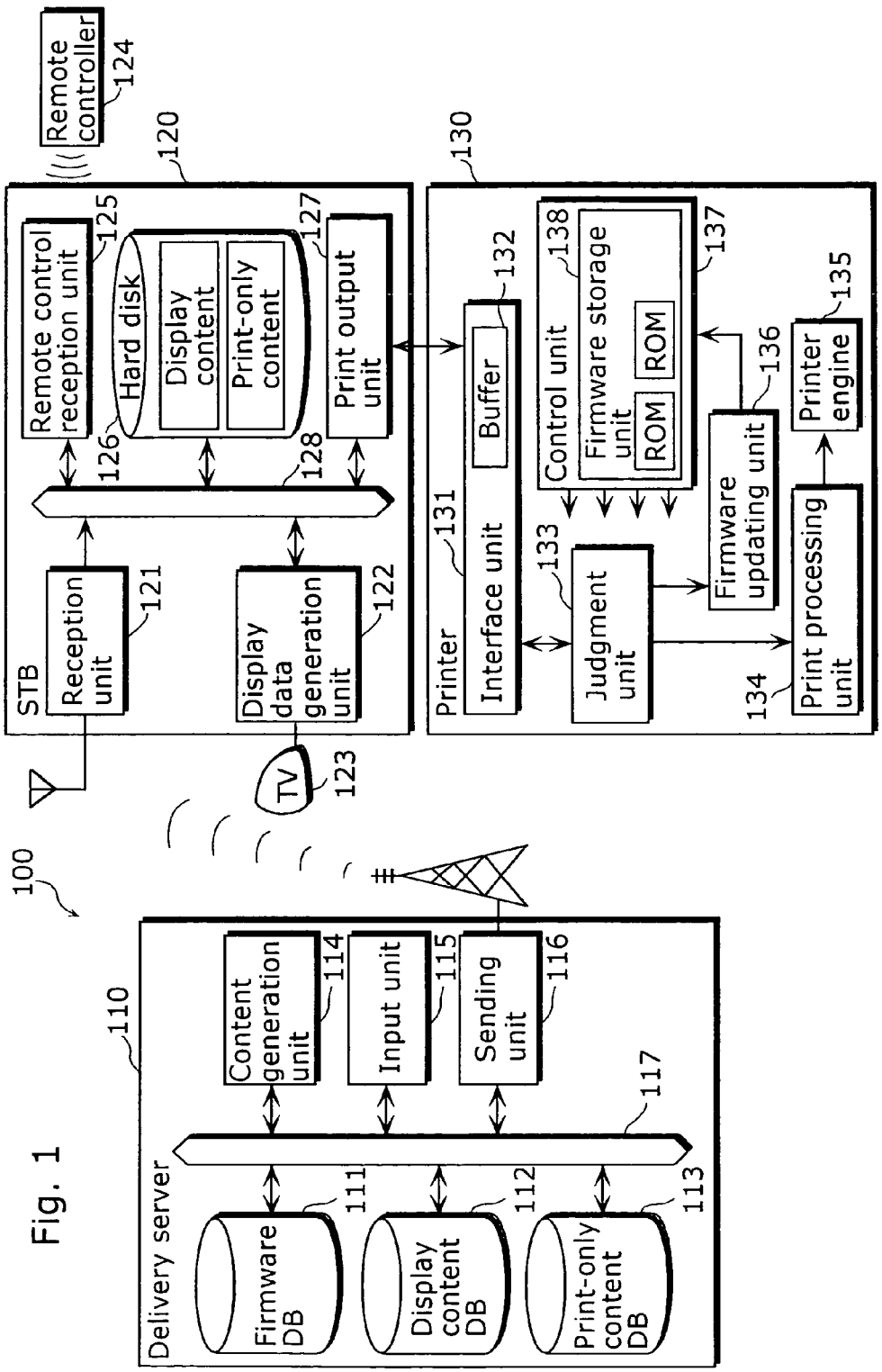
FIG. 1 is a functional block diagram showing a structure of the firmware updating system according to a first embodiment of the present invention.

FIG. 1 is a functional block diagram showing a structure of a firmware updating system 100 according to the first embodiment of the present invention. The firmware updating system 100 is a system in which firmware update data for printing is sent from a delivery server at a broadcasting station as a print-only content which is not to be displayed on the TV and is received by a home Set Top Box (STB), while a printer receives, from the STB, the firmware update data as print-only content and uses it to update its own firmware. The system includes a delivery server 110, an STB 120 and a printer 130. The print-only content is a content to be used exclusively for printing and cannot be displayed on a TV 123.

The delivery server 110, a server placed in the broadcasting station for TV broadcast, generates the broadcast content which allows the firmware update data to be a print-only content and sends the created broadcast content to each household through data broadcasting, for instance. Broadly speaking, the delivery server 110 includes three Data Bases (a firmware DB111, a display content DB112 and a print-only content DB113) made up of a hard disk or the like as well as three processing units (a content generation unit 114, an input unit 115 and a send unit 116) made up of a CPU or the like. The firmware DB111 stores firmware update data of various types of printers generated in advance. The print-only content DB113 stores print-only content generated beforehand. The content generation unit 114 combines the firmware, the display content and the print-only content stored in each of the DBs according to an input from an operator so as to generate a broadcast content. The input unit 115, equipped with an operation unit such as a keyboard, a mouse and a remote controller which are not shown in the diagram, inputs the signals gained from the operator who operates the operation unit. The send unit 116 broadcasts the generated broadcast content on the TV complying with a communication protocol defined by Standards after having converted it into a format for transmission use. A bus 117 is a parallel data transmission line that is set in the delivery server 110.

The STB 120 is a receiving terminal which includes functions such as a picture processing function, a data processing function, a user interface function and the like, for outputting the print-only content contained in the received broadcast content to the printer 130 without performing processing related to display and includes four units (a reception unit 121, a display data generation unit 122, a remote control reception unit 125 and a print output unit 127), a bus 128 which facilitates transmission of data among them, as well as a TV (Television) 123 and a remote controller 124 which are external apparatuses.

The reception unit 121 receives electric waves for TV broadcast so as to extract the broadcast content and stores each file contained in the extracted broadcast content in each directory of the hard disk 126, which is specified in compliance with the communication protocol for data broadcasting. The display data generation unit 122 includes a browser which can analyze BML and execute the print command indicated in the print-only content. It should be noted that it may be a browser which can analyze the XHTML1.0 which is defined by eXtensible Markup Language (XML) instead of Broadcast Mark-up Language (BML). The XHTML1.0 is a reworked HTML4.0 acknowledged by The World Wide Web Consortium (W3C) according to an XML system. Furthermore, the display data generation unit 122 reads out, from the hard disk 126, the files of the display content, according to the input received by the remote control reception unit 125, and generates display data in order to activate the TV 123. The TV 123 is a TV equipped only with a display function realized with CRT, PDP, LCD or the like and displays the display data generated by the display data generation unit 122. The remote controller 124 inputs what is contained in the input such as the print instruction operated by the user to the remote control reception unit 125 by means of infra-red radiation. Then, the remote control reception unit 125 receives the input from the remote controller 124. The hard disk 126 is a storage device for storing the broadcast content received from the delivery server 110. The print output unit 127 reads out the print-only content from the hard disk 126 according to the print output instructions sent from the browser responding to the input from the remote control reception unit 125, and outputs it to the printer 130. The bus 128 is a parallel data transmission line for exchanging data between each of the units in the STB 120.

The printer 130 that is a printer which is connected to the STB 120 via the IEEE1394 interface or the like, determines whether or not the print-only content received from the STB 120 is a print-only content for firmware updating use, obtains a data file necessary for updating from the hard disk 126 in the STB 120, in the case where the received print-only content is identified as a print-only content for firmware updating use, and then writes it into a ROM so as to update a firmware. The printer 130 includes a judgment unit 133, a print processing unit 134, a printer engine 135, a firmware updating unit 136 and a control unit 137.

The interface unit 131 is internally equipped with a buffer 132 and exchanges data between the printer 130 and the STB 120. The buffer 132 is a memory realized with a RAM and can be used with a view to reduce a speed differential between a processing speed of the printer 130 and a speed of inputting data from the STB 120 and also can be used for temporarily storing a firmware update file. The judgment unit 133 analyzes the data described in XHTMLP which is for printer-use, examines each file of the print-only content inputted from the STB 120 so as to determine whether or not the file is for firmware updating use. As a result of the determination, in the case where it is a firmware update file, the judgment unit 133 outputs it to the firmware updating unit 136, otherwise, to the print processing unit 134. The XHTML-P used for printers is a specification for print use which defines that the elements regarded as unnecessary for printing are deleted from the XHTML 1.0 specification and furthermore defines that a style sheet regarding printing such as a page break, a printing margin or others should be made reference. The print processing unit 134 analyzes the file inputted from the judgment unit 133, generates printing data in order to activate a printer head by rasterizing it or the like so as to output the generated printing data to the printer engine 135. The printer engine 135 prints the inputted print data. The firmware updating unit 136 updates a firmware by writing the firmware update data file inputted from the judgment unit 133 into an unused ROM of the two ROMs which compose a firmware storage unit 138 in the control unit 137. To be more concrete, the firmware updating unit 136 writes in a new firmware into a ROM which is not presently used for booting. Once the writing is completed, the firmware updating unit 136 switches the ROM where the new firmware is written with the ROM for booting use. Moreover, if the writing fails because of power failure during the writing, the original ROM for booting use remains to be used. Also, during the writing of the new firmware, the firmware updating unit 136 shall not respond to a print request from the STB 120 or shall only send back a notice telling that it is busy.

The control unit 137 is internally equipped with the firmware storage unit 138 and controls operations at each unit in the printer 130 in accordance with the firmware stored in the firmware storage unit 138. The firmware storage unit 138 is made up of two ROMs, including one ROM where a firmware is already written before the shipping of the printer 130, and the printer 130 operates by reading this firmware written in the ROM. The other ROM is a free space for writing an updated firmware and can prevent problems at the printer 130 caused by writing errors to the ROM by keeping in the booting ROM the older version of the firmware which is presently in use. The two ROMs are used in turn: one for storing a running program and the other for storing a firmware for updating use.

Figure 2:
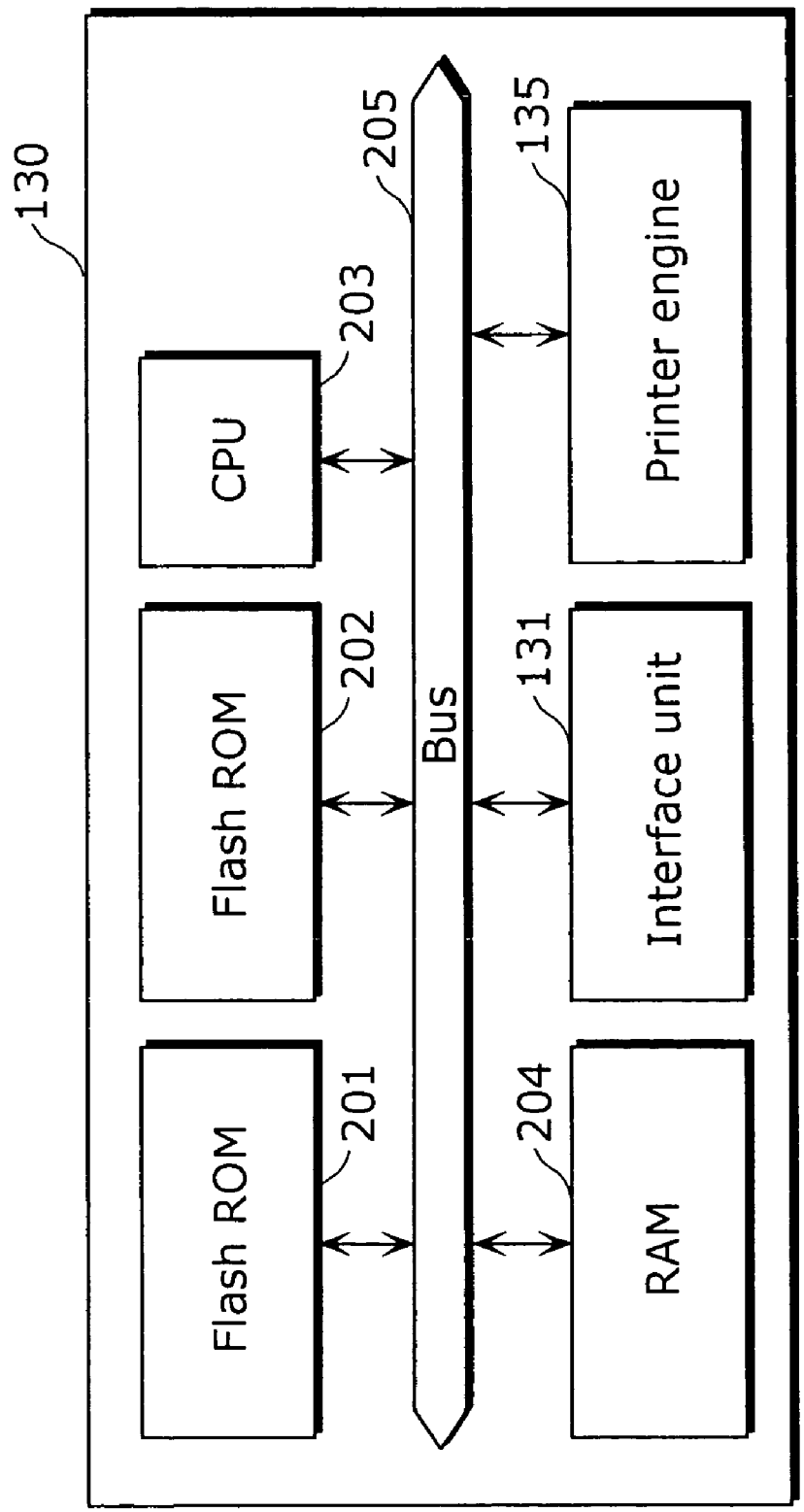
FIG. 2 is a block diagram showing a hardware configuration of the printer shown in FIG. 1.

FIG. 2 is a block diagram showing a hardware configuration of the printer 130 shown in FIG. 1. The printer 130 is a double-ROM-specified printer as shown in the diagram and includes a flash ROM 201, a flash ROM 202, a CPU 203, a RAM 204, a bus 205, the interface unit 131 and the printer engine 135. An explanation of the interface unit 131 and the printer engine 135 is omitted here as they are already mentioned. A firmware containing a boot program and a font figure is already written in either of the flash ROM 201 or the flash ROM 202 (for instance, the flash ROM 201) and the other (for instance, the flash ROM 202) is used as a backup for updating a firmware of the printer 130. The CPU 203, for example, realizes the functions of each processing unit shown in FIG. 1 (a judgment unit 133, a print processing unit 134, a firmware updating unit 136 and a control unit 137) by executing the firmware stored in the flash ROM 201 which is for booting use. The RAM 204 is used as a work area for the CPU 203 other than for the buffer 132 shown in FIG. 1. The bus 205 is a parallel data transmission line for exchanging data between the units in the printer 130.

Next, an operation of the firmware updating system 100 constructed as above is explained.

FIGS. 3A and 3B are diagrams showing the contents used in the firmware updating system 100 presented in FIG. 1 as well as a processing flow at each unit. FIG. 3A is a diagram showing the flow of processing at each unit in the firmware updating system 100 when the printer 130 shown in FIG. 1 prints normal print-only content. FIG. 3B is a diagram showing the flow of processing at each unit in the firmware updating system 100 when the printer 130 updates the firmware.

In the case where the printer 130 prints the normal print-only content under the firmware updating system 100, (1) the delivery server 110 firstly sends, through data broadcasting, a broadcast content consisting of a display content and a print-only content as shown in FIG. 3A. The STB 120, on the receipt of it, once stores the files included in the received broadcast content respectively to a specified directory in the hard disk 126, (2) reads out the display content so as to generate display data and outputs the generated display data to the TV 123. On the screen, a print button written "Print" as in the diagram, for example, is displayed together with a guiding phrase like "Please press the print button for printing print content". (3) When a user presses the print button following the displayed guiding phrase, the file constituting the print-only content is read out from the hard disk 126 and (4) the read-out print-only content is sent to the printer 130. The printer 130 (5) searches a tag indicating update of firmware in the print-only content inputted from the STB 120. Unless the tag is identified, the printer 130 generates print data analyzing the print-only content and (6) outputs sequentially the generated print data to the printer engine 135 so as to execute printing.

To update the firmware of the printer 130 under the firmware updating system 100, the delivery server 110, as a start, (1) sends the broadcast content consisting of the display content for firmware updating and the print-only content, that is, files for firmware updating use. The STB 120, on the receipt of it, stores the files included in the broadcast content to a specified directory as in the case of normal printing, (2) generates display data based on the display content and displays the generated display data on the screen of the TV 123. On the screen, an updating button "Update", for example, is displayed together with a guiding phrase like "Please press the updating button for updating the firmware."

(3) When the user presses the updating button following the displayed guiding phrase, the files constituting the print-only content is read out from the hard disk 126 and (4) the readout print-only content is sent to the printer 130. Namely, the STB 120 handles files in the same way regardless of what is written inside, namely, whether it is files for firmware updating use or a print-only content. The printer 130 searches for a tag indicating update of firmware in the print-only content. Since the tag indicating update of firmware is written at the head of the text in the file, the printer 130 determines the print-only content as files for firmware updating use, and (6) starts updating the firmware. Note that, in the case where the description in the content is identified as an instruction for printing, the printer 130 generates print data analyzing the detail of the content and outputs the generated print data to the printer engine 135 so as to execute printing.

Thus, since the STB 120 under the firmware updating system 100 can perform the printing of the print-only content as well as the update of the firmware of the printer 130, using the same processing, both of the operations can be performed without installing a new component for firmware updating in the STB 120.

Figure 4A:
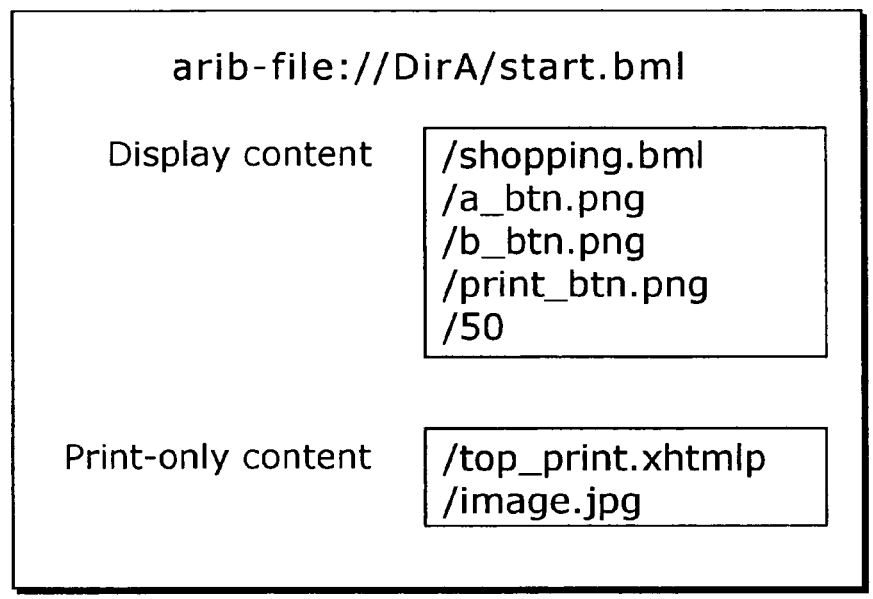
FIGS. 4A and 4B, respectively, show examples of the broadcast contents sent from a delivery server shown in FIG. 1.
Figure 4B:
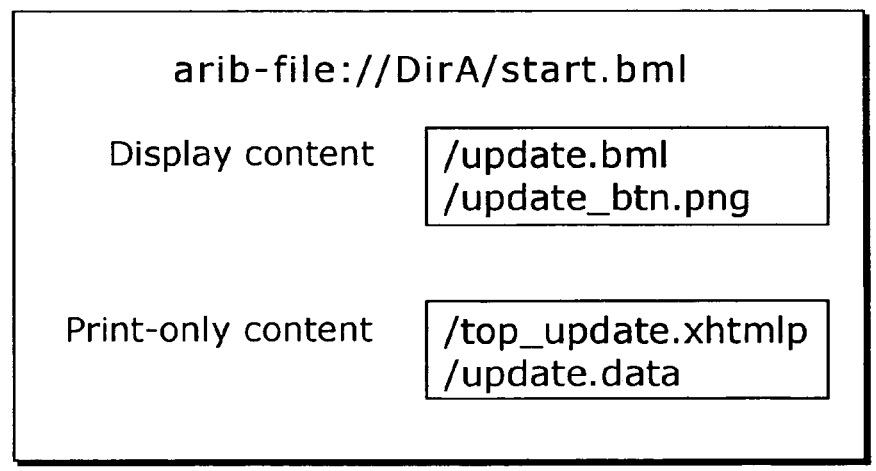

FIGS. 4A and 4B are diagrams showing examples of broadcast content sent from the delivery server 110 shown in FIG. 1. FIG. 4A is a diagram showing an example of the broadcast content in the case where the printer 130 carries out normal printing. FIG. 4B is a diagram showing an example of the broadcast content in the case where the printer 130 updates the firmware. In FIG. 4A and FIG. 4B, "arib-file:// DirA/start.bml" shows a top page included in the broadcast content. This file is a page firstly read out from the hard disk 126 with a browser included in the display data generation unit 122, and then started up. Note that in this page, however, a link for showing the browser a page to be firstly displayed is described in BML.

On one hand, the broadcast content for normal printing consists of a display content made up of files such as "shopping.bml," "a_btn.png," "b_btn.png," "print_btn.png" and "/50" as well as a print-only content which made up of files such as "top_print.xhtmlp" and "image.jpg". The file "shopping.bml" of the display content is a file in which the detail of display for TV shopping or the like is described in BML. "A_btn.png," "b_btn.png" and "print_btn.png" are Portable Network Graphics (PNG) files showing respectively a button A, a button B and a print button, displayed on the screen. The file "top_print.xhtmlp" of the print-only content is a file in which the detail of printing is described in XHTML, while the file "image.jpg" is a file for JPEG images cited in the file "top_print xhtm lp".

On the other hand, the broadcast content for updating a firmware as shown in FIG. 4B consists of, for example, a display content made up of "update.bml" and "update_btn.png", and a print-only content made up of "top_update.xhtmlp" and "update.data". The file "update.bml" of the display content is a file in which the detail of display showing an operating procedure for updating the firmware is described in BML whereas "update_btn.png" is a PNG file which shows the updating button to be displayed on the screen. The file "top_update.xhtmlp" of the print-only content is a file in which the detail of the processing for firmware updating operated by the printer 130 is described in XHTML, and, is also associated with the printer whereas the "update.data" is a data file for firmware update which is cited in the "top_update.xhtmlp".

FIGS. 5A and 5B are diagrams showing an example of the file of the display content shown in FIG. 4A as well as an example of its display. FIG. 5A is a diagram showing an example of the screen displayed on the TV 123 based on the file "shopping.bml" shown in FIG. 4A. FIG. 5B is a diagram showing an example of the file "shopping.bml" shown in FIG. 4A. It should be noted that for coding which is not directly related to the present invention, its graphic display and explanation are omitted here.

Version information for XML, an encode type of character code, a document type as well as on version information for BML (L501), a title "shopping" (L502) and others are described at the beginning of the file "shopping.bml" as shown in FIG. 5B. Then, processing carried out by the browser is defined as a function "keydown( )". What is defined here is that the browser prints the file "top_print.xhtmlp" (actually an output of the file "top_print.xhtmlp" to the printer 130) (L503).

In the body text, it is described that a display of the data file "/50" described with a MPEG2 video is to be displayed in a position starting from the 528th pixel from the left and the 40th pixel from the top with a size of 360 pixels in width and 202 pixels in height (L504). Next, a display of a button A 511 represented in a PNG file "a_btn.png" (L505) and a display of a button B 512 represented in a PNG file "print_btn.png" (L506) are described in the same way. Likewise, a display of a print button 513 represented in a PNG file "print_btn.png" and a function of "keydown( )" in the case where the print button 513 is pressed are further described (L507).

With the execution of such coding, the screen shown in FIG. 5A is displayed on the TV 123. For example, a video 510 of an automobile is displayed on the upper right on the screen of the TV 123 when a description of 504 is executed whereas the buttons A 511 and B 512 are displayed on the left-hand side on the screen of the TV 123 when the descriptions of L505 and L506 are executed. The print button 513 is displayed in the lower center of the screen when the description of L507 is executed and the function "keydown( )" is executed when the print button 513 is pressed. When the function of "keydown( )" is executed, a print command of "browser.print ("./top_update.xhtmlp")" which is directed to the browser and is defined in the description of L503 is executed and thereby the print output unit 127 reads out the file "top_print.xhtmlp" from the hard disk 126 so as to output it to the printer 130 according to the notice sent from the display data generation unit 122.

FIG. 6 shows an example of the file "top_print.xhtmlp" outputted to the printer 130 when the print button 513 is pressed on the display screen shown in FIG. 5A. As is shown in the diagram, as for the file of print-only content "top_print.xhtmlp," the version information for the XML, the document type of coding and the title are described at the beginning of the file "top_print.xhtmlp", as is same for the file of the display content shown in FIG. 5B, and character string information to be printed is described in the area between a tag "<P>" and a tag "</P>" in the text, for instance, "data broadcast TV shopping ... (omission) ... end of printing" or the like (L601). Furthermore, for an image which is to be printed in the same space, the JPEG file name of "image.jpg" indicating the image, the printing position (left: 528 pixels, top: 40 pixels) and the printing size (width: 360 pixels, height: 202 pixels) are described (L602). A printing result made up of the characters and the image which are used in the case of TV shopping can be gained following the description of this file "top_print.xhtmlp".

FIGS. 7A and 7B are diagrams showing an example of the file "update.bml" shown in FIG. 4B and an example of its display. FIG. 7A is a diagram showing an example of the screen displayed on the TV 123 based on the file "update.bml" in FIG. 4B. FIG. 7B is a diagram showing an example of the file "update.bml" in FIG. 4B. It should be noted that for coding which is not directly related to the present invention, its graphic display and explanation are omitted.

In the file "update.bml" shown in FIG. 7B, a browser's processing in the case where the function "keydown( )" is executed is defined, namely, it is defined that the browser prints the "top_update.xhtmip" (L701) as is the case for the file "shopping.bml" shown in FIG. 5B. It is described that character string information to be displayed on the TV 123 is described in the text "Updating on-line the firmware of your printer. Please press the 'Firmware update' button." in an area between a tag "<P>" and a tag "</P>" in the text (L702) below the L701. Then, as objects, display position and size of an updating button 711 whose form is represented in a PNG file "update_btn.png" are described, and it is further described that an execution of the function "keydown( )" takes place when the updating button 711 is pressed (L703).

With the execution of the coding shown in FIG. 7B, the TV 123 continues to display the character string 710 "Updating on-line the firmware of your printer. Please press the 'Firmware update' button" described in the L702 as shown in FIG. 7A, and the updating button 711 is displayed below it. When this updating button 711 is pressed, the file of the print-only content "top_update.xhtmlp" is outputted to the printer 130 in accordance with the function "keydown( )", as is already explained above.

FIG. 8 is a diagram showing an example of the file "top_update.xhtmlp" outputted to the printer 130 when the updating button 711 is pressed on the display screen shown in FIG. 7A. The same is described in the first part of the file "top_update.xhtmlp", that is, a print-only content for firmware updating, as is described in the file "top_print.xhtmlp" shown in FIG. 6B. The difference is that a tag starting with "update" is described in the beginning of the text (L801). This tag contains attribute information such as "MEI" which represents vendor information of the printer and is to be updated in firmware updating process, "5.0.1" which represents version information of the updated firmware, "cefiro2002" which represents model ID to be updated and option information.

The judgment unit 133, having read this tag, compares the attribute information described in the tag and its own attribute information written in the booting ROM in the firmware storage unit 138. If the printer 130 corresponds to the target model for firmware updating of the target vendor, has the specified options, and, its own firmware version is older than the version information in the tag, the judgment unit 133 obtains from the hard disk 126 a firmware update data file "update.data" (L 802) specified by version-upgrade data source attribute described in the L801 so as to output it to the firmware updating unit 136. The firmware updating unit 136 writes this file into the ROM which is not for booting included in the firmware storage unit 138 and updates the firmware. In the firmware update data file "update.data", the firmware of the latest version, for example, is described in a machine language.

Then, information which notifies the user of a completion of the update of the firmware is described in a character string that goes "The version of the firmware is updated. The present version is 5.0.1." in the area between the tag "<P>" and the tag "</P>" (L803). The judgment unit 133 outputs this character string to the print processing unit 134, and the printer engine 135 prints the character string so that the printer 130 can inform the user of the information corresponding to the contents of the version-upgrade. Meanwhile, the judgment unit 133 will not perform updating if the attribute information of its own does not correspond to the conditions described in the attribute information of the tag and process the next line following the tag "</update>". It should be noted that in the case where firmware update fails, information for notifying the user of it may be described in the area between the tag "<P>" and the tag "</P>" in advance so as to inform the user of the failure.

Thus, in the case of updating the firmware, the judgment unit 133 can determine promptly whether the processing to be carried out, indicated in the print-only content, is printing or updating of firmware by describing the tag "<update>" at an early stage in the analysis of the top page of the print-only content "top_update.xhtmlp", which means at the head of the text here, and can start promptly respective processing.

It should be noted that in the first embodiment, the STB 120 displays the display screen indicating update of firmware, waits for the update button to be pressed, and has the browser execute the print instruction indicated in the file "top_update.xhtmlp". The present invention, however, is not restricted to this and the print instruction directed to the browser "browser.print("top_update.xhtmlp")" may be described at the head of the file "update.bml" of the display content. In this way, the browser of the STB 120 executes the print instruction without receiving an input for instructing printing from the user. Namely, the STB 120 receives the print instruction directly from the delivery server 110. As a result, the printer 130 can start promptly the updating processing of the firmware without waiting for the display processing performed by the STB 120 as well as the user's input to the display screen. Since the STB 120 can display other display content instead of inquiring the user of the update of the firmware, the firmware of the printer 130 can be updated in the background.

It should be noted that in the first embodiment mentioned above, the judgment unit 133 judges whether the processing of the print-only content is for printing or for updating firmware based on a presence of the tag "<update>". The present invention, however, is not restricted to this and another method may be used, for example, the names of the files of print-only content. To be more concrete, the STB 120 may output files by notifying the file names of all the files outputted to the printer 130 so that the judgment unit 133 may determine to update the firmware in the case where the name of the file inputted from the STB 120 is the one specified beforehand, for instance, "update.xhtmlp," and may determine to perform print processing if it is other file name. In this case, it does not matter whether the file name of the file for updating firmware use is "update.xhtmlp" or not, however, an absolute file name whose application is already defined in a markup language as well as in a communication protocol shall not be used.

Figure 9:
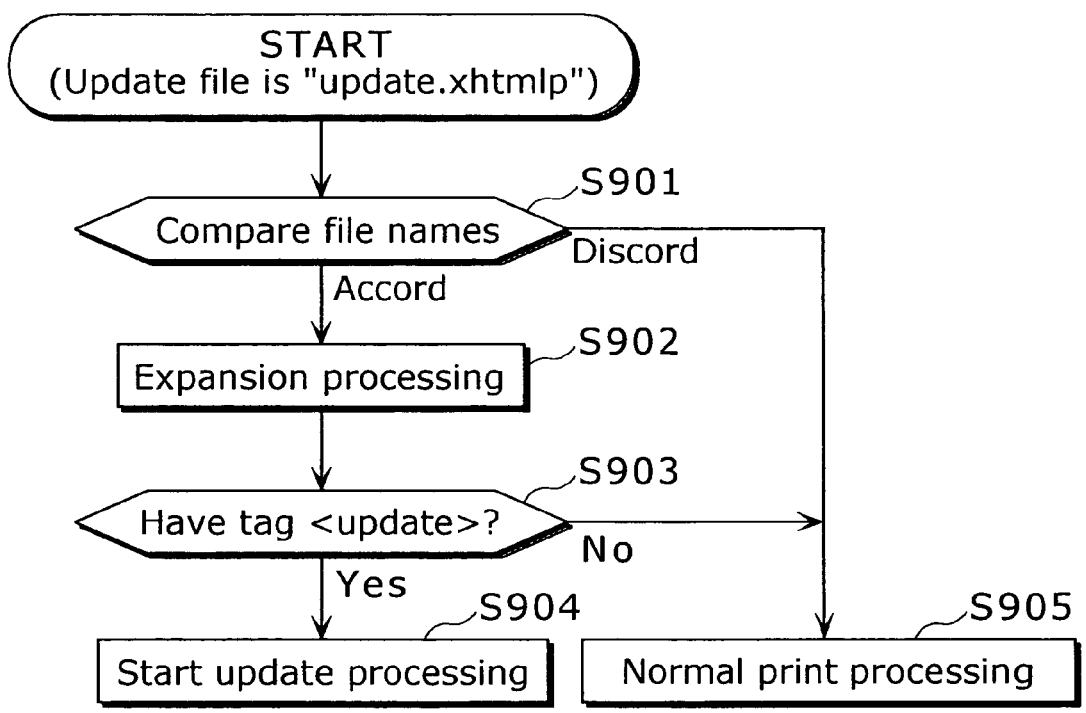
FIG. 9 is a flowchart showing the procedure of determining whether or not to update a firmware by comparing names of files, performed by a judgment unit.

In this case, the judgment unit 133 may once open only the file whose file name corresponds to the specified file name, search the tag "<update>" so as to perform the updating processing of the firmware only when the tag "<update>" is found, after the determination of the processing by comparing the file names in order to prevent malfunctions due to the errors in the file names. FIG. 9 is a flowchart showing the procedure operated by the judgment unit 133 for judging whether to update the firmware or not by comparing the file names. The judgment unit 133 compares a file name of the inputted print-only content with a file name which is specified in advance as a file name of a file for updating firmware use (S901), and once opens the file in question in the case where they correspond (S902).

Moreover, the judgment unit 133 searches for the tag "<update>" in the unfolded file (S903) and begins updating processing of the firmware when it is found (S904). If not, a normal printing processing (S905) starts. In the case where the file name of the inputted print-only content does not correspond to the specified file name, the normal printing processing begins. As mentioned above, the judgment unit 133 opens only the files estimated as those for firmware updating use when the file names match and then searches for the tag "<update>". This realizes a prompt detection of the tag "<update>" in the case where the file name of the inputted print-only content is correct. It can also prevent malfunctions in executing firmware updating processing based on the file in spite that the file is for printing.

It should be noted that in the first embodiment, it is explained that the judgment unit 133 of the printer 130 obtains, from the hard disk 126 in the STB 120, the firmware update data file "update.data" whose file name is cited straightly after the tag "<update>" so as to output it to the firmware updating unit 136. The present invention, however, is not restricted to this method, and instead, the contents of the firmware update data file "update.data" may be described with in-line expansion in the top page file "top_update.xhtmlp" for firmware updating use. Thus, the firmware updating is performed without any problems even if the printer 130 does not have a (PULL) function to obtain a target file from the hard disk 126 in the STB 120.

It should be noted that in the first embodiment, the character string for printing the notice of the completion of firmware updating is described in the update data file. It is, however, not always necessary to describe it in the update data file. A print file notifying the completion of firmware updating may be stored beforehand in the ROM so that the contents of printing may be printed out each time the update of firmware is completed. Likewise, appropriate character strings may be stored beforehand in the ROM so that these character strings and attribute information like the version information in the tag "<update>" may be combined so as to create phrases notifying the completion of firmware updating each time the update of firmware is completed.

Second Embodiment

Figure 10:
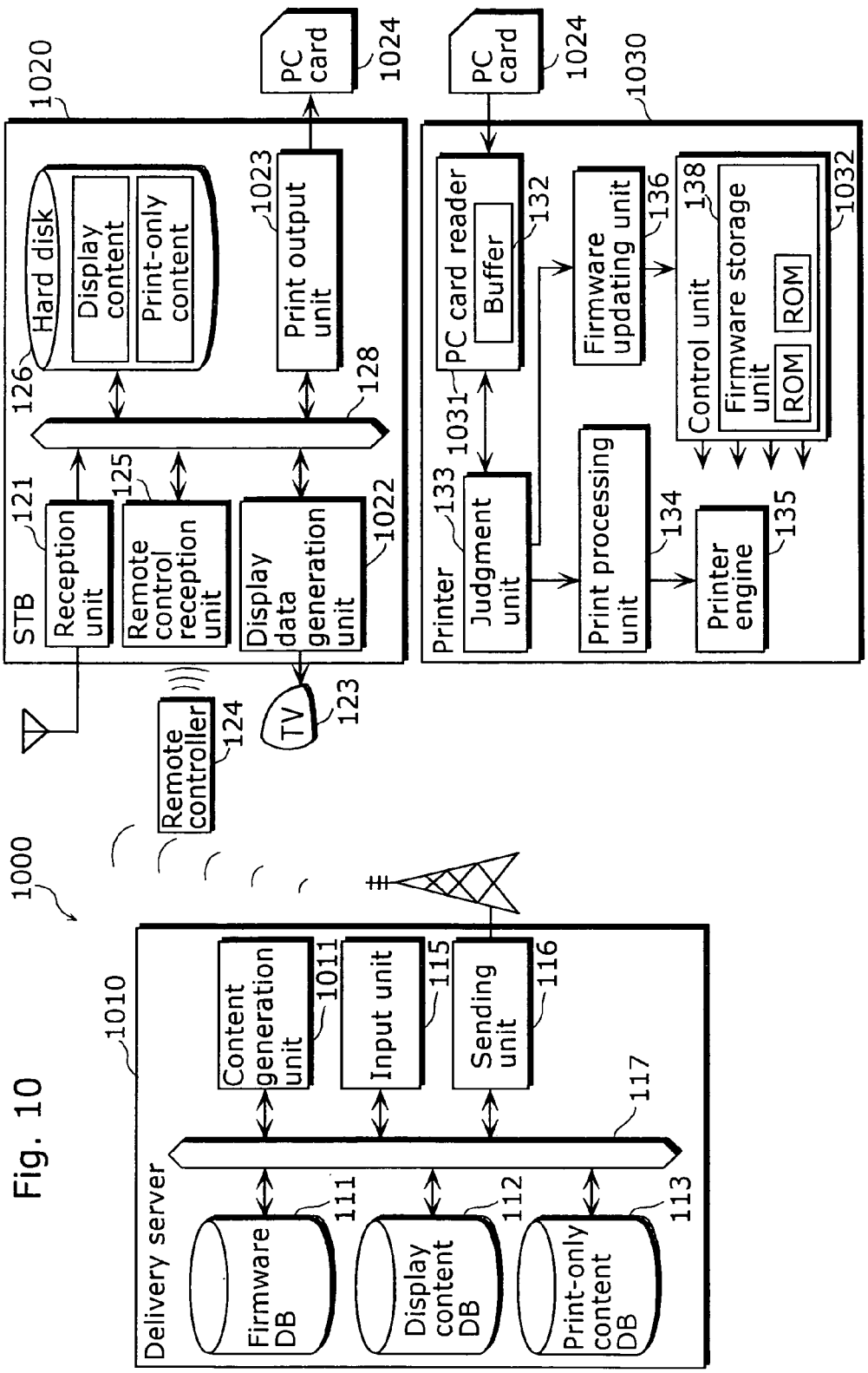
FIG. 10 is a functional block diagram showing a structure of the firmware updating system according to a second embodiment of the present invention.

FIG. 10 is a functional block diagram showing a structure of a firmware updating system 1000 according to the second embodiment of the present invention. The firmware updating system 1000 is a system in which the firmware update data for printing, which is one of the above-mentioned print-only contents is sent as an attached file to a broadcast e-mail that is described in a BML format from a delivery server placed in a broadcasting station for TV broadcast, a home STB which has received it saves the data once in a storage medium like a PC card so that a firmware of the printer is updated off-line. The system includes a delivery server 1010, an STB 1020 and a printer 1030. The same referential marks are put for the components which are the same as those composing the firmware updating system 100 described in the first embodiment, and the description is omitted as is already explained in the first embodiment.

The delivery server 1010 is a server, which generates a broadcast e-mail in a BML format in which a firmware update file of the printer is regarded as an attached file, and sends the generated broadcast e-mail to each household through TV broadcast. Roughly speaking, the delivery server 1010 includes three Data Bases (DB) (the firmware DB111, the display content DB112 and the print-only content DB113) consisting of a hard disk or the like and three processing units (the input unit 115, the send unit 116 and a content generation unit 1011) consisting of a CPU or the like.

The content generation unit 1011 incorporates in advance the firmware update data file of the printer in the firmware DB111 in a firmware updating program in the print-only content DB 113 and generates print-only content for firmware updating use. Furthermore, the content generation unit 1011 reads out from the display content in the firmware DB112 a broadcast e-mail that guides to update the firmware of the printer so as to generate a display content.

The STB 1020 is a communication terminal with a function to receive the TV broadcast so as to acquire the broadcast e-mail addressed to it; a function of data reading/writing from and in a storage medium such as a PC card; and a function to write print-only content attached to the broadcast e-mail in the PC card when a memory writing instruction of the print-only content is sent from the remote controller 124 while the display content of the received broadcast e-mail is displayed. The STB 1020 includes the hard disk 126 realized with four processing units (a reception unit 121, a remote control reception unit 125, a display data generation unit 1022 and a print output unit 1023) realized with the CPU; a bus 128 which transfers data between them; and a TV 123, a remote controller 124 as well as a PC card 1024 which are external apparatuses.

The display data generation unit 1022 includes a browser compatible with XHTML and BML which can identify a file of the print-only content using file extensions so as to execute saving commands. The print output unit 1023 reads out the print-only content from the hard disk 126 following the saving commands directed to the browser responding to an input from the remote control reception unit 125, and writes the readout print-only content in the PC card 1024. The PC card 1024 is a portable storage medium in which an IC chip is embedded.

The printer 1030 is a printer that reads out, from the PC card 1024, a print-only content for firmware updating use, and updates an internal firmware according to the readout print-only content for firmware updating use. The printer 1030 includes the firmware storage unit 138 realized with two ROMs, the buffer 132 realized with a RAM, five processing units (the judgment unit 133, the print processing unit 134, the firmware updating unit 136, a PC card reader 1031 and a control unit 1032) to be realized with a CPU or the like and a printer engine 135. The PC card reader 1031 reads out the print-only content from the PC card 1024 and outputs it to the judgment unit 133. The PC card reader 1031 also reads out from the PC card 1024 a data file for firmware update use as requested from the judgment unit 133, and outputs it to the judgment unit 133. The control unit 1032 controls processing at each unit in the printer 1030 in accordance with the firmware written in the boosting ROM included in the firmware storage unit 138.

Next, an operation of the firmware updating system 1000 constructed as shown above is explained.

Figure 11A:
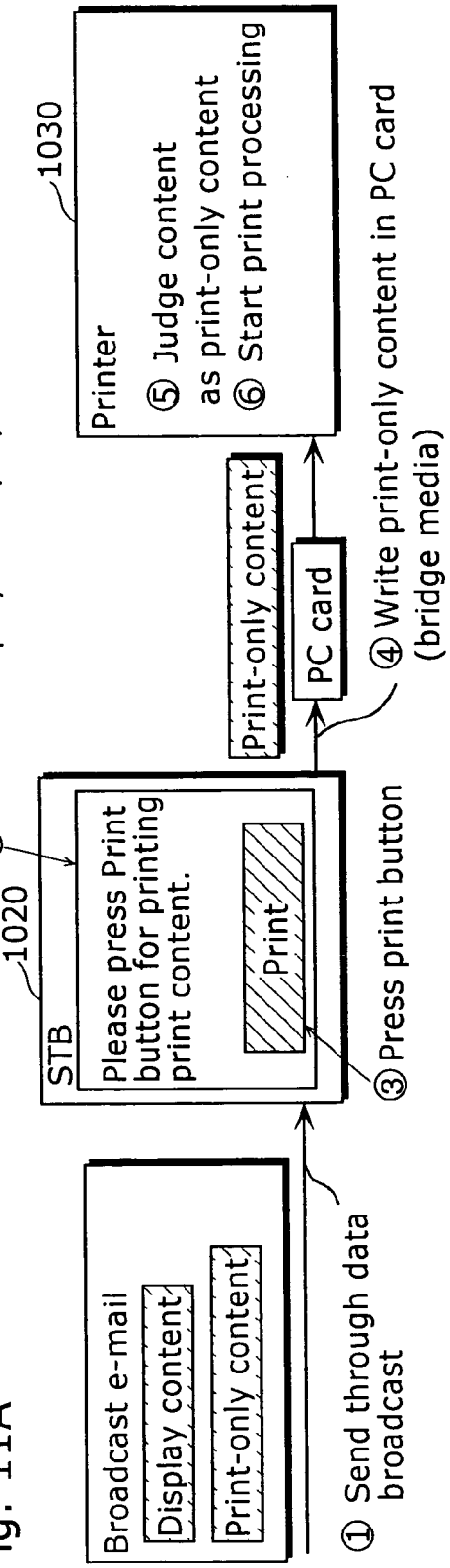
FIGS. 11A and 11B, respectively, show the contents used in the firmware updating system presented in FIG. 10 and a sequence of processing at each unit.
Figure 11B:
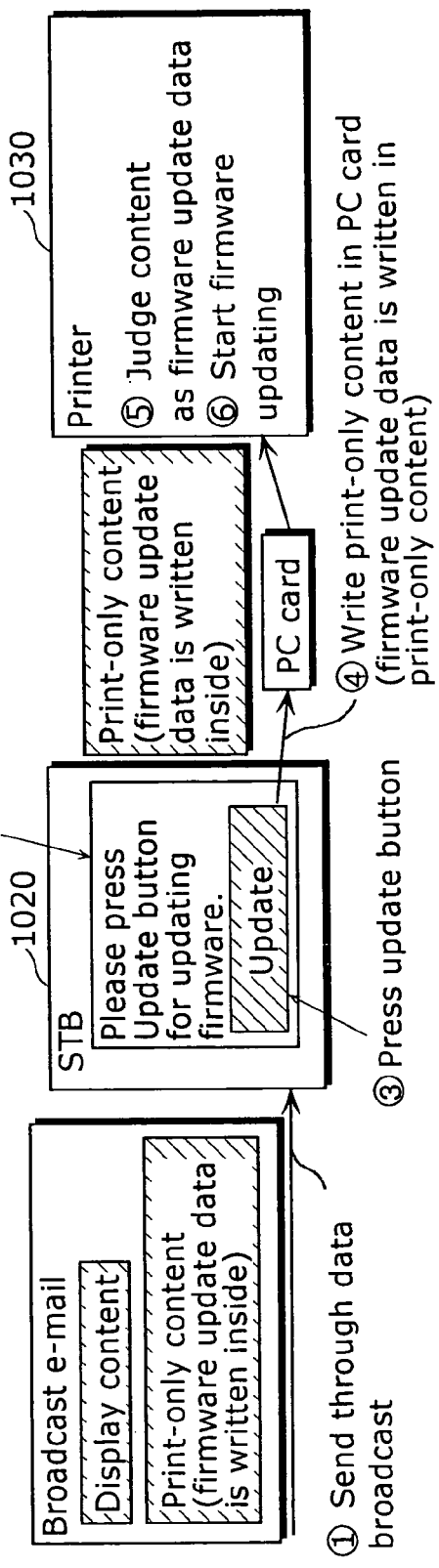

FIGS. 11A and 11B show respectively contents and a processing flow at each unit under the firmware updating system 1000 shown in FIG. 10. FIG. 11A shows a flow of processing at each unit in the case where the printer 1030 shown in FIG. 10 prints normal print-only content. FIG. 11B shows a flow of processing at each unit in the case where the printer 1030 shown in FIG. 10 updates the firmware.

In the case where the printer 1030 prints normal print-only content under the firmware updating system 1000, firstly, (1) a display content in which a print-only content is regarded as an attached file is sent as a broadcast e-mail from the delivery server 1010. The STB 1020, having received the data broadcasting, examines a destination address of the broadcast e-mail and incorporates it inside when it is identified as the one addressed to itself. Then, the STB 1020 once stores the incorporated broadcast e-mail as well as the attached file respectively to a specified directory in the hard disk 126, (2) reads out the display content so as to generate display data and outputs the generated display data onto the TV 123. On the screen of the TV 123, for example, a button "Print" is displayed as in the diagram together with a guiding phrase "Press the print button for printing print content". (3) When the user presses the button following the displayed guiding phrase, the files constituting the print-only content are read out from the hard disk 126, and (4) the readout file is written in the PC card 1024. The printer 1030 (5) reads out the print-only content from the PC card 1024, searches for a tag indicating update of firmware in the readout print-only content and then generates printing data by analyzing the detail of the content unless the tag is identified. The printer 1030 (6) executes printing by outputting sequentially the generated printing data to the printer engine 135.

Also, in order to update the firmware of the printer 1030, as a start, the delivery server 1010 sends, to the STB 1020 through data broadcasting, a broadcast e-mail in which a print-only content, that is, files for firmware updating use, is regarded as an attached file. In the broadcast e-mail, the phrases announcing a firmware update are displayed. The STB 1020, upon a receipt of it, stores the display content and the print-only content respectively in a specified directory in the hard disk 126 as in the case of normal printing, generates display data based on the display content and displays the generated display data on the screen of the TV 123. On the screen, for example, an updating button "Update", as shown in the diagram, is displayed together with a guiding phrase that goes "Please press the updating button for updating the firmware". When the user presses the updating button following the displayed guiding phrase, the files constituting the print-only content are read out from the hard disk 126, and the readout print-only content is written in the PC card 1024.

When this PC card 1024 is inserted into the printer 1030, the printer 1030 reads out the print-only content from the PC card 1024 and searches for a tag indicating update of firmware in the readout file. In the file, the tag indicating update of firmware is written at the head of the text; therefore, the printer 1030 can rapidly judge the print-only content as a firmware update file. Then, update of the firmware starts according to the firmware update file. However, the printer 1030 generates printing data and executes printing in the case where a description instructs for printing is found in the content.

Thus, the STB 1020 under the firmware updating system 1000 can save in the PC card 1024 either print-only content or firmware update data in the same way and execute processing off-line in the printer 1030, therefore, a firmware can be updated without adding any new components to the STB 1020.

FIGS. 12A and 12B are diagrams showing a file of a broadcasting e-mail "shopping.bml" and an example of its display in the case where normal print-only content is printed off-line. FIG. 12A shows an example of the screen displayed on the TV 123 based on the file of the broadcast e-mail "shopping.bml" which is also a display content. FIG. 12B shows an example of the display content file "shopping.bml". The display content file "shopping.bml" as shown in FIG. 12B is almost the same as the display content file "shopping.bml" shown in FIG. 5B. The difference is that browser's processing corresponding to a function "keydown( )" when a print button defined in L1202 is pressed means here to save, respectively, files "top_print.xhtmlp" and "image.jpg" to a storage device represented by an argument "SD", namely, to the PC card 1024 (L1201). Consequently, when a button "Print off-line the print-only content" displayed on the screen of FIG. 12A is pressed by the user's operation using the remote controller 124, saving commands such as "browser.save("./top_print.xhtmlp", "SD")" and "browser.save ("./image.jpg", "SD")" directed to the browser are executed in accordance with the function "keydown( )" and then, the file "top_print.xhtmlp" as well as the file "image.jpg" are written in the PC card 1024. The files "top_print.xhtmlp" and "image.jpg" are as same as those explained in FIG. 4A and in FIG. 6. The print processing at the printer 1030 is as same as the one explained in the first embodiment.

FIGS. 13A and 13B show a file of the broadcast e-mail "update.bml" and an example of its display in the case where the firmware is updated off-line. FIG. 13A shows an example of the screen displayed on the TV 123 based on the file of the broadcast e-mail "update.bml" which is also a display content. FIG. 13B shows an example of the display content file "update.bml" for updating the firmware. The display content file "update.bml" is almost the same as the display content file "update.bml" shown in FIG. 7B. The difference is that the browser's processing that corresponds to the function "keydown( )" when a "Firmware update" button as defined in the L 1303 is pressed is saving commands "browser.save("./top_print.xhtmlp", "SD")" and "browser.save("./image.jpg", "SD")" which mean to save, respectively, the files "top_update.xhtmlp" and "update.data" to the PC card 1024 represented with the argument "SD" (L1301).

Also, the STB 1020 operates the same processing as is performed for print-only content, however, a character string that goes "The firmware of your printer needs to be updated. Please press the updating button and update the firmware." is described in the area between the tag "<P>" and the tag "</P>" (L1302), and the same guiding phrase as this character string is displayed on the screen of the TV 123. As a result, the user operates the remote controller 124 following the guiding phrase, then the function "keydown ( )" is executed when the button "Firmware update" displayed on the screen shown in FIG. 13A is pressed. Then, the browser executes the saving commands of "browser.save("./top_update.xhtmlp", "SD")" and "browser.save("./update.data", "SD")" following the function so that the files "top_update,xhtmlp" and "update.data" are written in the PC card 1024. The files "top_update.xhtmlp" and "update.data" are as same as those described in FIG. 4B as well as in FIG. 8, and the updating processing performed by the printer 1030 is as same as the one described in the first embodiment. The "SD" is a character string representing the type of the PC memory card, and in the case of using a different memory card, the one corresponding to it shall be set.

Thus, according to the second embodiment, just by installing in the STB 120 or in the STB 1020, the browser can identify the file of print-only content and execute the print command as well as a save command indicated in the print-only content, and update of the firmware of the printer 130 or that of the printer 1030 can be realized without needing further functions in the STB 120 or in the STB 1020.

It should be noted that, in the second embodiment, the print-only content and the print-only content for firmware updating use are regarded as the files attached to the broadcast e-mail. However, these print-only contents are not always necessary to attached, and selected files or all of the files in such print only contents may be stored in a server on the Internet and a link may be described in the text of the broadcasting e-mail or a URL which leads to these print-only contents may be described at the head of the broadcast e-mail. The amount of the data of the file attached to the broadcast e-mail may be limited. In this way, the delivery server 1010 can send the print-only content and the print-only content for firmware updating use to the STB 1020, without having a limitation in the amount of data. In this case, where the printer 1030 includes a communicating function for a connection to the Internet, the printer 1030 can straightly obtain from the Internet the target print-only content and the target print-only content for firmware updating use, without going through the STB 1020.

FIG. 14 shows an example of the data file of the print-only content for firmware updating use "top_update.xhtmlp" in the case where the data file for firmware update "firm.data" is specified at a URL. In the text of the file "top_update.xhtmlp," as shown in FIG. 14, a URL "http://www.virtual.co.jp/firm.data" is described indicating a location of the data file "firm.data" for firmware updating use on the Internet defined with an attribute "src" and an element "update" (L1401). Consequently, when a vendor of the printer is described with a code "MEI," and a version of the firmware is older than "5.0.1," the printer obtains a data file "firm.data" from the URL http://www.virtual.co.jp/firm.data via the Internet and can update the firmware.

It should be noted that, in the second embodiment, it is explained that the print button and the updating button should be displayed in the text of the broadcast e-mail. It is not always necessary, however, to display each of the buttons in the text, and e-mail software, for instance, may display them.

In the second embodiment, the firmware update data of the printer 1030 is sent as an attached file of the broadcast e-mail and the firmware is updated off-line using the PC card 1024 with a PC card slot placed in the STB 1020 and the printer 1030, however, it is not always necessary to update the firmware off-line. The firmware may be updated on-line while connecting the STB 1020 to the printer 1030 with use of the interface IEEE1394 or the like, as in the first embodiment. The STB 120 and the printer 130 described in the first embodiment, equipped respectively with the slot for the PC card 1024, may send the firmware update data of the printer as a print content from the delivery server at the broadcasting station so as to update off-line the firmware of the printer 130.

In the second embodiment, the PC card 1024 is used as a bridge media to transfer the firmware update file from the STB 1020 to the printer 1030, however, the present invention should not be limited to this, and a flash memory card may be used instead.

Also, in the second embodiment, the print-only content and the print-only content for firmware updating use are sent as attachments to the broadcast e-mail, however, it is not always the case that the print-only contents are sent by attaching them to the broadcast e-mail, and may be sent as attachments to an e-mail from the delivery server on the Internet.

Next, response processing (a bunch processing due to error processing or the like) corresponded to various types of printers in the STB is explained as a variation of the above-mentioned embodiment.

Figure 15:
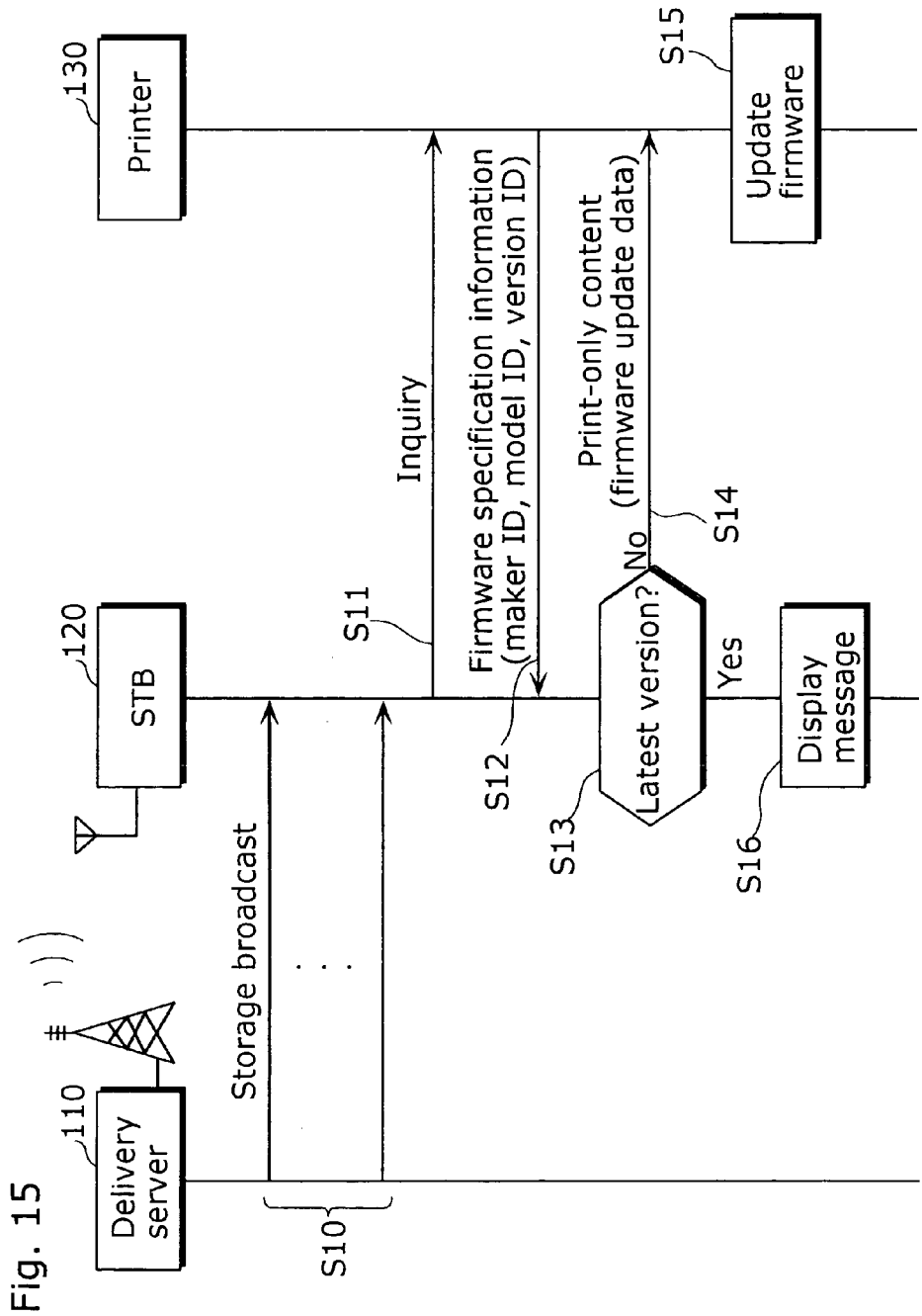
FIG. 15 is a sequence diagram showing an STB's response to the printer.

FIG. 15 is a sequence diagram showing the response processing between the STB 120 and the printer 130 under the firmware updating system 100. Here, the latest firmware update data corresponding to each type of the printers is stored in the STB 120 through storage broadcast, and examples of the processing necessary for the STB 120 according to the model of the printer 130 being connected to the STB 120 and the version of the firmware are shown.

More specifically, the delivery server 110 is a broadcasting station which performs storage broadcast or the like, and delivers the firmware update data of the latest version for all the types of the printers connectable to the STB 120, as broadcast data (S10). The STB 120 stores all of the firmware update data in the hard disk 126.

When obtaining from the user an instruction to update the firmware of the printer, the STB 120 firstly inquires about firmware specification information from the printer 130 being connected (S11) so as to obtain the information from the printer 130 (S12). The firmware specification information is information for specifying the firmware included in a target printer out of all the types of the printers connectable to the STB, and includes, for example, a maker ID identifying a maker of the printer, a model ID identifying a model of the printer (uniquely assigned by the maker), a version ID identifying a version of the firmware (uniquely assigned by the maker), and others.

The STB 120 then compares the firmware specification information obtained from the printer 130 and the information related to the latest version distributed in advance from the delivery server 110 so as to judge whether or not the version of the firmware installed in the printer 130 being connected is the latest one (S13). In the case where the version of the firmware is not the latest (No at S13), the STB 120 reads out the corresponding firmware update data from the hard disk 126 and outputs it as a print-only content to the printer 130 (S14). Thus, the updating of the firmware is operated by the printer 130 as in the above-mentioned embodiment (S15).

Meanwhile, when judging the version of the firmware installed in the printer 130 as the latest one, using the obtained firmware specification information, the STB 120 terminates the processing by presenting a message "There is no need to update the firmware." to the user (S16).

FIG. 16 shows an example of the display content which realizes the brunch processing (S11~S14, S16 in FIG. 15) performed by the STB 120 as mentioned above. The display content shown in the diagram is what is included in the broadcast content distributed from the delivery server 110 like the display content in FIG. 7B in the first embodiment, in which a script aiming at outputting the firmware update data as a print-only content to the printer 130 is described. Namely, the script, which aims at obtaining the firmware specification information (an output of firmware update data or a display of an error message telling that the update of the firmware is not needed or the like) from the printer 130 so as to execute the brunch processing corresponded to the information, is described in an area between the tag "<script>" and the tag "</script>".

It should be noted that meanings of various functions (API; Application Program Interface) used in the display content is as shown in FIG. 17. A function "browser.getPrinterMakerID( )" is a function for obtaining a maker ID of the printer being connected or the like. A function "browser.getPrinterTypeID( ) is a function for obtaining a model ID of the printer being connected or the like. A function "browsergetPrinterSoftwareVersion( ) is a function for obtaining a version ID of the firmware installed in the printer being connected or the like.

Thus, when the bunch processing based on the firmware specification information obtained from the printer is described beforehand in the display content distributed from the delivery server 110, the STB 120 can output the firmware update data corresponded to the printer actually connected to the STB 120 and can perform an error processing if this is not necessary only by carrying out the operations according to the received display content.

It should be noted that the firmware update data which STB 120 receives and stores will have an increase in the amount of data as time goes by. However, the STB 120 may, for example, delete the firmware update data which has been stored over a certain period of time so that the amount of data may not surpass a storage capacity of the hard disk 126.

For the display content shown in FIG. 16, it is presupposed that one printer is connected to the STB 120; however, the case in which a plurality of printers are connected to the STB 120, for example, can be handled as follows.

The first method is to specify beforehand one printer by the user with use of a device management function ("device navigation" or the like) installed in the STB 120 so that the STB 120 may identify the specified printer to be updated during the firmware updating processing.

The second method is to distribute to the STB 120 the display content which includes a program in which a plurality of printers are to be updated during firmware updating by using various functions (i.e., API which obtains information on a plurality of printers connected to the STB 120) as shown in FIG. 18, and let the STB 120 execute it. For example, as shown in FIG. 18, the number of the printers connected to the STB 120 is specified using the function "browser.getCapablePrinterNumber( )" as a start, and then a list of IDs (printer ID) for distinguishing the printers being connected is obtained using the function "browser.getCapablePrinterList(int List[ ]), and furthermore, by calling up the functions "browser.getPrinterMakerID(int printerID), "browser.getPrinterTypeID( )" and "browser.getPrinterSoftwareVersion( )" which regard each ID as an argument, the maker ID, the model ID and the version ID of each printer are obtained so that a script to update the firmware for all these printers can be incorporated in the display content. The STB 120, having obtained such display content, can update all at once the firmware for a plurality of the printers connected to the STB 120, by operating in accordance with the script.

Third Embodiment

Next, the firmware updating system according to a third embodiment of the present invention is described. The present firmware updating system resembles the first embodiment in the respect that the STB updates the firmware installed in the printer by outputting the firmware update data as a print-only content to the printer. However, the difference is that the STB does not receive the firmware update data as broadcast data but obtains the data on-demand from a specified website via the Internet.

Figure 19:
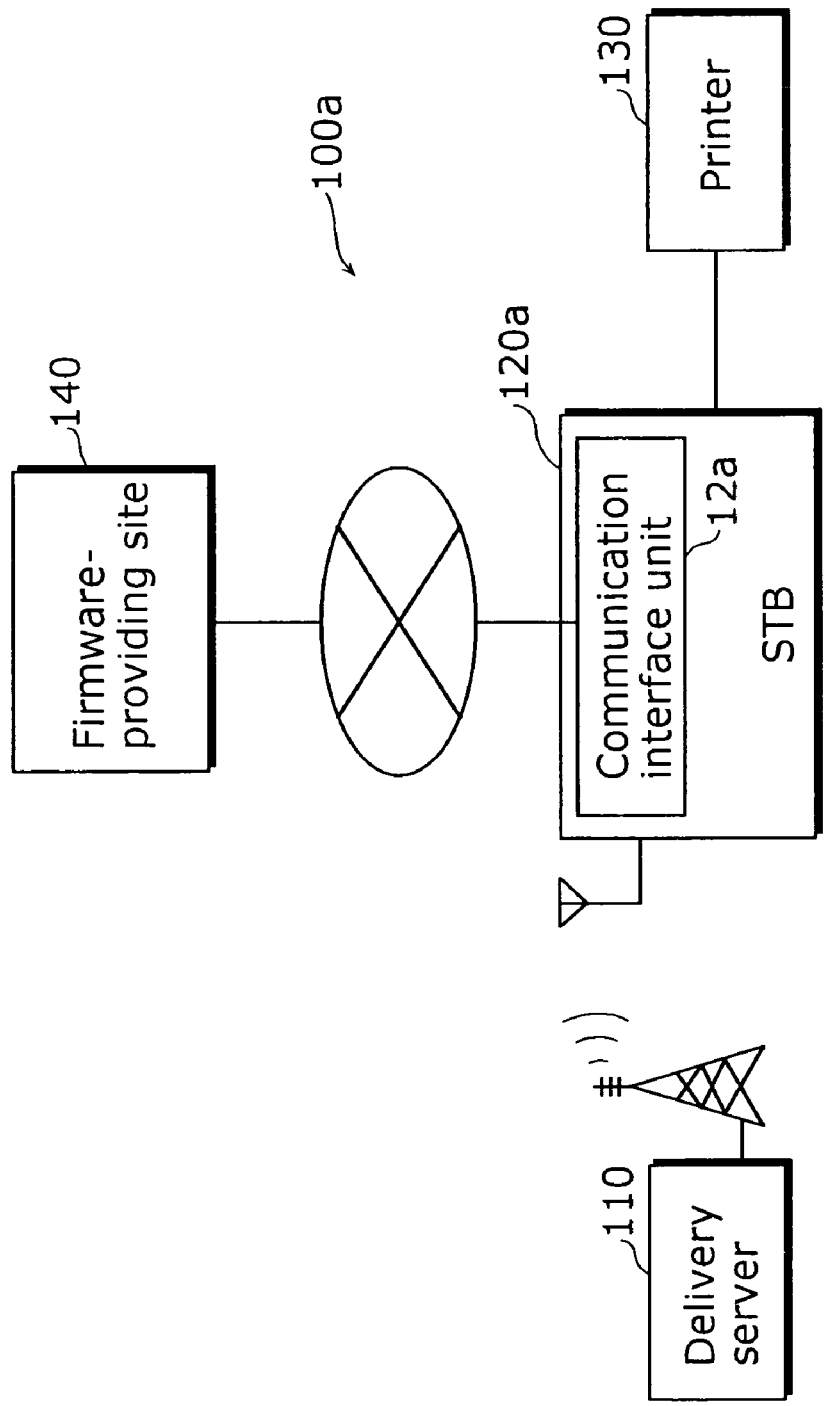
FIG. 19 is a diagram showing a whole configuration of the firmware updating system according to a third embodiment of the present invention.
Figure 22:
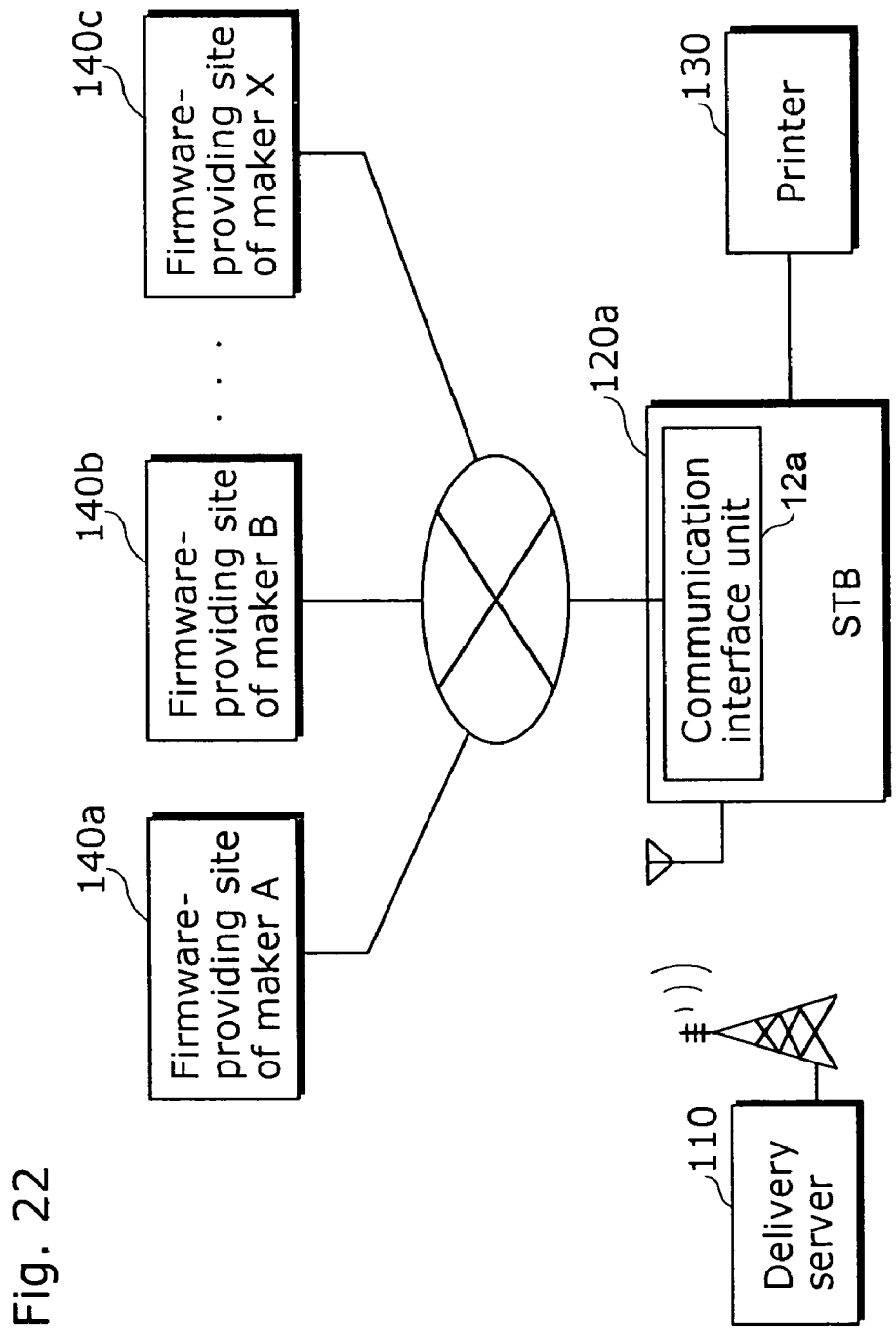
FIG. 22 is a diagram showing a whole configuration of the firmware updating system according to a transformational example of the third embodiment of the present invention.

FIG. 19 is a diagram showing the whole configuration of the firmware updating system 100a according to the present embodiment. The system 100a includes a firmware-providing site 140, that is, a portal site for providing services to update a firmware of the printer, in addition to the components included in the firmware updating system 100 described in the first embodiment.

Namely, the delivery server 110 and the printer 130 are the same as those described in the first embodiment, but the STB 120a includes a communication interface 129 such as a modem which communicates with the firmware-providing site 140 via the Internet, in addition to the components included in the STB 120 according to the first embodiment. The firmware-providing site 140 is a website which stores the latest firmware update data for the printers of all sorts of makes and models so as to provide the user with such data.

FIG. 20 is a diagram showing a sequence of firmware updating of the printer 130 under the firmware updating system 100a. The STB 120a firstly obtains instructions to update a firmware of the printer 130 (S20) from the user, requests the printer 130 to send firmware specification information using the API shown in FIG. 17 or the like (S21) so as to obtain it (S22).

The STB 120a then gains access to the firmware-providing site 140 via the communication interface 129 and the Internet, requests the firmware specified by the firmware specification information (maker ID, model ID and version ID) obtained from the printer 130 (S23) so as to output the firmware as a print-only content to the printer 130 (S25) while downloading the firmware from the firmware-providing site 140 (S24), and lets the printer 130 execute printing (it is actually an update of the firmware) (S26).

FIG. 21 shows an example of the display content which enables the STB 120a described above to acquire firmware update data (S21~S25 in FIG. 20). The display content shown in the diagram is what is included in the broadcast content distributed from the delivery server 110, like the display content shown in FIG. 7B in the first embodiment, and a script which aims at obtaining the firmware update data from the firmware-providing site 140 so as to output the data as a print-only content to the printer 130 is described. Namely, in an area between the tag "<script>" and the tag "</script>", a program (i.e., "browser.print( )") that aims at obtaining the firmware specification information from the printer 130 so as to output for printing, to the printer 130, the firmware update data (http://maker10/type1/v2/top_update_maker10_type1_v2.xhtmlp) specified according to the firmware specification information while downloading it from the firmware-providing site 140 is described.

In this way, the firmware of the latest version of the printer 130 connected to the STB 120a is downloaded to the STB 120 via the Internet, and then, outputted to the printer 130 for printing so that the firmware of the printer 130 is updated.

According to the present embodiment, the STB 120a does not distribute (broadcast) the firmware update data of all sorts of models as broadcast content, but keeps it at a specific site on the Internet and downloads only those targeted for updating the firmware of the printer 130. There is, therefore, no need to consider a problem of limitation in a broadcasting band when broadcasting the firmware update data of the printers of all sorts of models. The present embodiment is preferable as a route for obtaining the firmware update data especially when the communication interface 129 installed in the STB 120a is an always-connected interface adapted to the broadband Internet.

It should be noted that in the firmware updating system 100a of the present embodiment, the firmware update data of all sorts of printer makers is kept in one place on the Internet (firmware-providing site). However, it may be scattered at websites 140a~140c which differ depending on the maker. For example, a firmware updating system with an on-demand method adapted to the case of having plural websites 140a~140c is realized by distributing in advance the display content as shown in FIG. 23 from the delivery server 110 to the STB 120a so as to allow the STB 120a to execute it.

Figure 24:
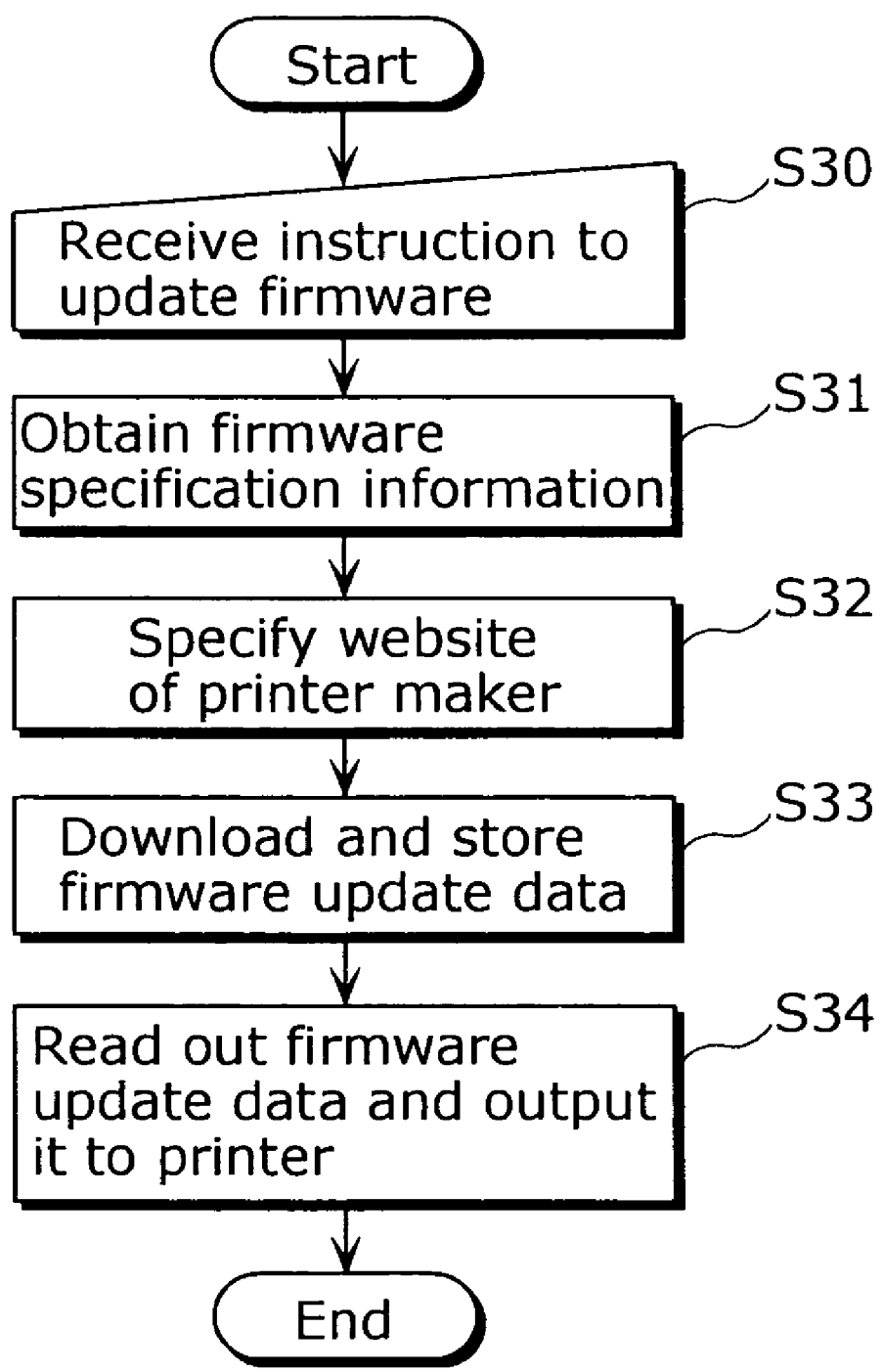
FIG. 24 is a flowchart showing the procedure used in the operation for executing the display content shown in FIG. 23, performed by the STB.

FIG. 24 is a flowchart showing the procedure operated by the STB 120a that executes the display content shown in FIG. 23. The STB 120a receives the instruction to update the firmware of the printer from the user (S30), obtains the firmware specification information from the printer 130 being connected (S31), specifies, according to the obtained firmware specification information, the firmware-providing sites 140a~140c which are websites uniquely created by a maker who provides the latest firmware of the printer 130 (S32), downloads the latest firmware update data from the website and stores it in the hard disk 126 (S33). Then, the STB 120a reads out the downloaded firmware update data from the hard disk 126 and outputs it to the printer 130 (S 34). Thus, the version of the firmware is updated to the latest one in the printer 130.

It should be noted that in the flowchart shown in FIG. 24, the obtainment of the firmware (S31) corresponds to the functions "browser.getPrinterMakerID( )", "browser.getPrinterTypeID( )" and "browser.getPrinterSoftwareVersion( )" which are used for the display content in FIG. 23 while the specification of the website of the printer maker (S32) as well as the download and storage of the firmware update data (S33) corresponds to the function "browser.get_save(http://maker10/type1/v2/top_update_maker10_type1_v2.xhtmlp", ".?top_update_maker10_type1_v2.xhtmlp")" and the output of the stored firmware update data to the printer 130 (S34) corresponds to the function "browser.print("top_update_maker10_type1_v2.xhtmlp")".

By thus applying a method to scatter the firmware update data to the different websites, depending on the maker of the printer, a total size of the firmware update data placed in one site is reduced and it needs no processing for putting the firmware update data together in one place.

When the firmware of the printer 130 consists of a plurality of program files written in a format capable of dynamic linking, for example, like a shared library format of Linux and a DLL of Windows or the like, and in the case where the program files are partly modified for firmware updating, all that is needed to do is to replace partly the existing files with the modified files for the printer 130.

FIG. 25 shows an example of the print-only content "top_update.xhtmlp" including the firmware update data that is a program DLL file. As for the firmware update data represented in the dynamic link DLL format shown in FIG. 25, the program file "update.dll" is placed in a section indicated with the tags "<update>" and "</update>", as is obvious compared to the firmware update data "update.data" which is a normal data file, as shown in FIG. 8.

Thus, the size of the files to be downloaded becomes smaller and little time is needed for its transfer, and furthermore, the time to the flash ROM is shortened by keeping the firmware update data formatted as a program file.

It should be noted that for a timing to update the firmware of the printer (a notice that a firmware of a certain model is revised and a release of the latest firmware update data is realized), it may be notified to the user by the broadcast e-mail sent from the delivery server 110 and the e-mail sent from the printer maker.

The firmware updating system according to the present invention has been explained based on the three embodiments; however, the present invention is not limited to these embodiments.

For example, the top page file of the display content is explained as a BML file in the above-mentioned embodiments. The description language, however, is not necessarily limited to the BML and the HTML, or even another language may be used as long as the browser in the STB can analyze them. The same applies to a description language used for a print-only content. It is not always necessary to use HTML-P, and another language may be used.

Furthermore, the case where the firmware update data is a dynamic link file is explained above, however, the present invention is not limited to this and the firmware update data may be constructed in a format different from the former firmware update data. Namely, the STB 120a does not output the firmware update data to the printer 130 while downloading it at the same time, but outputs it to the printer after having stored it once in the hard disk 126. Therefore, the firmware update data to be downloaded can be kept as a difference file with respect to the firmware update data of the former version. This means that the information for specifying the changes made in the firmware update data of the former version and the detail of the changes are stored as a difference file so that the STB 120a can conflate the difference file that is just downloaded and the file of the former version that is already stored in the hard disk 126 so as to output a complete set of data thus gained to the printer 130.

Also, a difference file obtained based on the difference between the firmware of the new version and that of the older version may be included in the firmware update data. This does not mean to straightly replace the firmware of the older version with that of the new version, but to store the information for specifying the modified part within the firmware of the older version, as a difference file, in the firmware update data. In this case, it is not the STB 120a but the printer 130 who conflates the difference file. The conflation method, for example, is to copy the firmware of the older version to the ROM which is not for booting use and specify the changes made within the firmware based on the information in the difference file so as to rewrite the specified part accordingly. Thus, by keeping the firmware update data formatted as a difference file, the size of the files to be downloaded becomes smaller and little time is required for the transfer.

Also, a receiving apparatus, which receives the display content and print content sent from the delivery server (or firmware update data), and provides a printer with the print content, is not restricted to an STB and may be a communication apparatus such as a personal computer, a personal digital assistant, a cell phone and the like. For example, it is conceivable to print outdoor the pictures downloaded to a cellular phone via the Internet by connecting the phone to a printer for public use which is placed at the station. Therefore, under the firmware updating system according to the present embodiment, the receiving apparatus which receives the firmware update data is not restricted to an STB, and it may be a cell phone, a personal digital assistant, or the like, each being equipped with a function to output to the printer.

Figure 26:
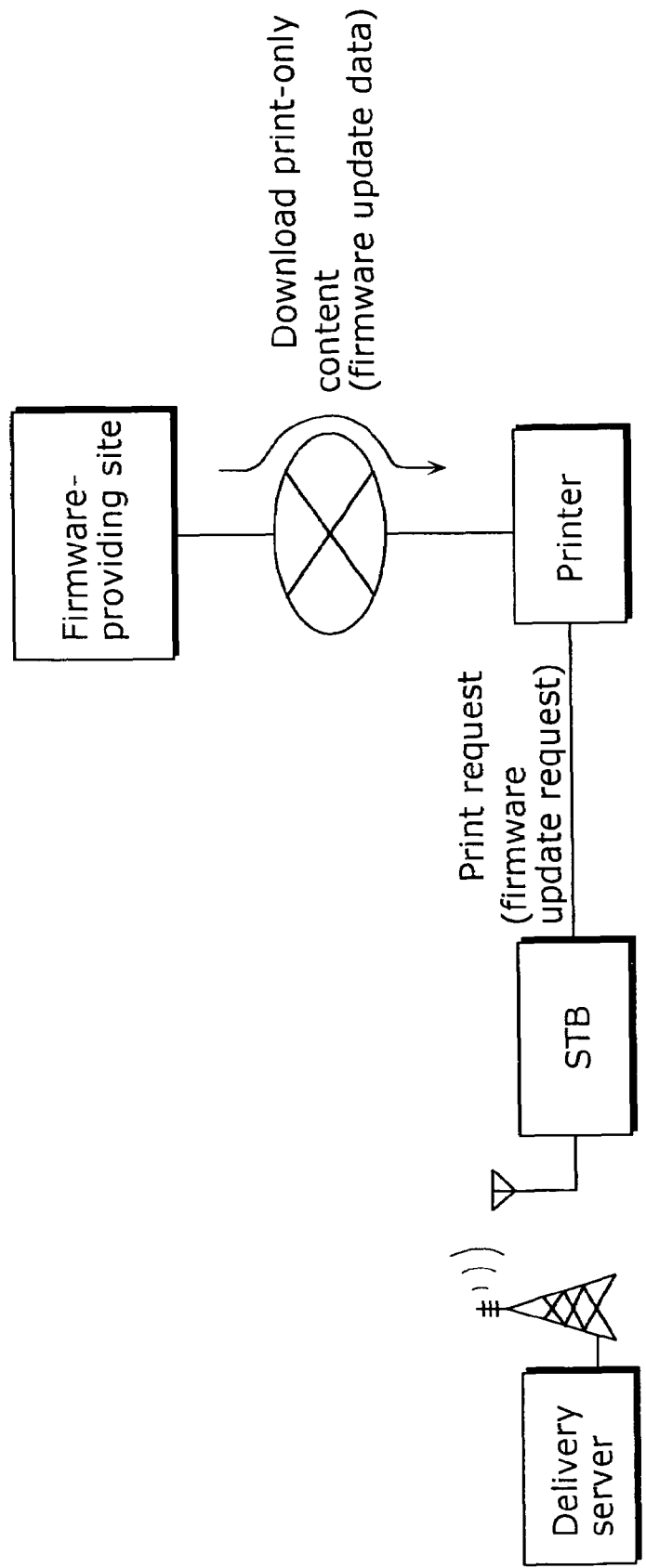
FIG. 26 is a diagram showing a whole configuration of the firmware updating system according to a transformational example of the present invention.

Also, in the aforementioned embodiments, the printer obtains a print content (or firmware update data) via the STB or the bridge media. However, in the case where a printer is a PULL type directly connected to the Internet, as in the direct method shown in FIG. 26, the printer may PULL a print content (firmware update data in the present embodiment) from a web server on the Internet so as to execute update of the firmware. For example, when a request to print the print content placed at a specified Web server is issued from the STB, the printer 130 may download the print content (or firmware update data) from the web server and print it out (or update the firmware). There is, therefore, no need for the STB to either relay firmware update data to the printer or perform buffering.

Also, the firmware update data files in the above embodiments such as "update.data" and "update.dll" may be compressed files. It is efficient to have firmware update data as a compression file especially for transferring firmware update data from the STB to the printer through the bridge media with low cost and small storage capacity. Then, these files may be kept as files in a self-unpacking format.

Furthermore, a link of the difference DLL file is not restricted to be operated by the STB and it may be the printer which performs the linking operation. Namely, the printer, having obtained firmware update data as a difference DLL file via the STB, the bridge media, the Internet or the like, may generate a firmware of the latest version by linking to the firmware of the existing version stored in the firmware storage unit 138 and write the generated firmware into the firmware storage unit 138 so as to update the existing version.

It should be noted that in the above-mentioned embodiments, the case where a firmware is mainly a program for controlling the printer is explained. The firmware, however, may include not only a program but also data such as a font for printing, external character data and others. The firmware update data for updating such firmware may be just the font and external character data themselves or just difference data for updating data by adding them to the existing set of font data.

The rules may be defined beforehand in order to identify firmware update data as either a program only, a program that includes data or data only, using a file name, an extension or a tag of the firmware update data.

Also, the program included in the firmware update data is not limited to OS such as a control program or the like, and may be an application program or an in-between program of the OS and the application.

Furthermore, the firmware update data may include an off-set address for updating an address of the control program within a ROM as well as data for updating the control program.

Also, a firmware or firmware update data may include a plurality of different programs or plural pieces of different data. In this case, the firmware update data shall include an address indicating each location within the ROM for each data to be written.

It should be noted that in the above-mentioned embodiments, it is explained that only a control unit includes a firmware storage unit in a printer and controls operations at each unit in the printer by executing the firmware stored in it. The present invention, however, is not limited to this, and furthermore, a printer engine may include two ROMs for firmware storage use which are independent of the control unit, and may have a configuration in which the printer engine operates independently of the control unit by executing a firmware for printer engine use. The printer engine in this case includes not a configuration consisting of mechanical parts only but a control unit exclusively for printer engine use which analyzes the firmware for printer engine use so as to execute it. What is more, in this case, a firmware for control unit use and a firmware for printer engine use shall be identified using file names which are defined in advance based on the specific rules.

On the other hand, when the firmware update data inputted from the judgment unit is a firmware for printer engine, the firmware updating unit writes it in the ROM which is not for booting included in the printer engine. The case where the firmware update data inputted from the judgment unit is a firmware for control unit use is as already explained. Thus, the printer according to the present invention can update the firmware for control unit use as well as the firmware for printer engine use without any problems even in the case where the printer engine includes two ROMs for storing the firmware which are set independently from the control unit. In this case, the firmware update data explained as one data in the above-mentioned embodiments can be divided into two types: one for control unit use; and the other for printer engine use. This therefore reduces the amount of firmware update data received or downloaded at one time by updating them respectively in different timings.

Furthermore, in the third embodiment, the case where the STB obtains, from the printer, the firmware specification information including the version ID of the firmware so as to download the latest firmware update data is explained. The present invention, however, is not limited to this. When the STB can not obtain the version ID of the firmware from the printer, the STB may gain an access to the server based on the maker ID and the model ID obtained from the printer so as to download the firmware update data presented as "latest" on the server.

Also, in the above-mentioned embodiments, the STB includes the hard disk 126 as a storage medium for storing the received display content and print-only content. However, the STB may include instead a semiconductor memory like RAM or a storage medium like a removable memory card or the like.

In the above-mentioned embodiments, only firmware data for one model is described in the firmware update file, written in the markup language and outputted as print data to the printer. However, the firmware data for a plurality of models may be described in advance so that the printer may identify and select a firmware for itself based on the firmware specification information or the like so as to update the firmware.

INDUSTRIAL APPLICABILITY

The server of the present invention is useful as a content delivery server at the broadcasting station where data including a print content is broadcasted or as a delivery server for distributing a print content to a portable terminal such as a mobile phone via mobile phone lines or the like. The receiving apparatus of the present invention is useful as a mobile phone and a portable terminal which receives contents including a print content or the like. The printing apparatus of the present invention is useful as a printer exclusively connected to a receiving apparatus such as an STB and a DTV as well as to a portable terminal or the like.

The invention claimed is:

1. A firmware updating system comprising:
a server that distributes a content;
a receiving apparatus that receives the content from said server; and
a printing apparatus that operates according to a firmware stored in a ROM and prints a print content inputted from said receiving apparatus, wherein said printing apparatus is different from said receiving apparatus and said server includes:
a content generation unit operable to generate a content that includes television display content and a firmware update file, the firmware update file being a print content which is not to be displayed and being a file in which data for updating the firmware is described; and
a content sending unit operable to send the content to said receiving apparatus,
said receiving apparatus includes:
a content reception unit operable to receive the content from said content sending unit;
a print instruction obtainment unit operable to obtain, from a user, a print instruction to print the print content; and
a print output unit operable to output, to said printing apparatus, the print content included in the content, without performing processing related to display, when the print instruction is obtained, and
said printing apparatus includes:
a judgment unit operable to judge whether the print content outputted by said receiving apparatus is a firmware update file or a file to be printed;
an updating unit operable to update the firmware using the print content when said judgment unit judges that the print content is a firmware update file; and
a printing unit operable to print the print content when said judgment unit judges that the print content is the file to be printed.

2. The firmware updating system according to claim 1, wherein said judgment unit is further operable to search for a firmware update command described in the print content, and to judge the print content as a firmware update file when the firmware update command is found.

3. The firmware updating system according to claim 1, wherein said print output unit is further operable to output, to said printing apparatus, the print content together with a file name of the print content, and
said judgment unit is further operable to judge the print content to be a firmware update file when the file name of the print content outputted by the receiving apparatus is specified in advance.

4. The firmware updating system according to claim 3, wherein said judgment unit includes a confirmation unit operable to search for a firmware update command described in the print content, and to confirm that the print content is a firmware update file when the firmware update command is found, and
said updating unit is further operable to update the firmware using the print content after confirmation.

5. The firmware updating system according to claim 1, wherein said receiving apparatus further includes
a content storage unit operable to store each received content in a specified area, and
said updating unit further includes a file obtainment unit operable to obtain, from the specified area, another firmware update file specified in the print content, and operable to update the firmware using data included in the other firmware update file.

6. The firmware updating system according to claim 1, wherein said printing apparatus further includes a firmware storage unit having two ROMs, and operates according to a firmware stored in one of the ROMs, and
said updating unit updates the firmware of said printing apparatus by storing a firmware whose version is updated in the other ROM.

7. A firmware updating method for a system including a server that distributes a content, a receiving apparatus that receives the content from the server, and a printing apparatus that operates according to a firmware stored in a ROM and prints a print content inputted from the receiving apparatus, wherein the printing apparatus is different from the receiving apparatus, said method comprising:
generating, with the server, a content that includes television display content and a firmware update file, the firmware update file being a print content which is not to be displayed and being a file in which data for updating the firmware of the printing apparatus is described; and
sending, with the server, the content to the receiving apparatus,
receiving at the receiving apparatus, the content from the server;
obtaining at the receiving apparatus, from a user, a print instruction for the print content; and
outputting from the receiving apparatus, to the printing apparatus, the print content included in the content, without performing processing related to display, when the print instruction is obtained, and
judging, using the printing apparatus, whether the print content outputted from the receiving apparatus is a firmware update file or a file to be printed;
updating, using the printing apparatus, the firmware using the print content when said judging judges that the print content is a firmware update file; and
printing, using the printing apparatus, the print content when said judging judges that the print content is the file to be printed.

8. The firmware updating method according to claim 7, wherein in said judging, a firmware update command described in the print content is searched for, and the print content is judged as a firmware update file when the firmware update command is found.

9. The firmware updating method according to claim 7, wherein in said outputting, the print content is outputted to the printing apparatus together with a file name of the print content, and
in said judging, the print content is judged as a firmware update file when the file name of the print content outputted by the receiving apparatus is specified in advance.

10. The firmware updating method according to claim 9, wherein said judging further comprises searching for a firmware update command described in the print content, and confirming that the print content is a firmware update file when the firmware update command is found, and
in said updating, the firmware is updated using the print content, after said confirming.

11. The firmware updating method according to claim 7, wherein said receiving, said obtaining, and said outputting operations further include storing each received content in a specified area,
said updating operation further comprises obtaining, from the specified area, another firmware update file specified in the print content, and
in said updating operation, the firmware is updated using data included in the other firmware update file.

12. The firmware updating method according to claim 7, wherein the printing apparatus includes two ROMs and operates according to a firmware stored in one of the ROMs, and
in said updating, the firmware of the printing apparatus is updated by storing, in the other ROM, a firmware whose version is updated.

* * * * *